(12) United States Patent
Kanamarlapudi et al.

(10) Patent No.: US 12,464,598 B2
(45) Date of Patent: *Nov. 4, 2025

(54) MANAGEMENT OF ONE OR MORE STATE VARIABLES ASSOCIATED WITH A COMMUNICATION WINDOW

(71) Applicant: QUALCOMM Incorporated, San Diego, CA (US)

(72) Inventors: Sitaramanjaneyulu Kanamarlapudi, San Diego, CA (US); Prasad Reddy Kadiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/454,004

(22) Filed: Aug. 22, 2023

(65) Prior Publication Data
US 2024/0008135 A1    Jan. 4, 2024

Related U.S. Application Data

(63) Continuation of application No. 17/451,618, filed on Oct. 20, 2021, now Pat. No. 11,778,683.
(Continued)

(51) Int. Cl.
*H04W 76/27*    (2018.01)
*H04L 12/18*    (2006.01)
(Continued)

(52) U.S. Cl.
CPC .......... *H04W 76/27* (2018.02); *H04L 12/185* (2013.01); *H04L 12/1881* (2013.01);
(Continued)

(58) Field of Classification Search
CPC . H04W 76/27; H04W 72/30; H04W 36/0016; H04L 12/185; H04L 12/1881
(Continued)

(56) References Cited

U.S. PATENT DOCUMENTS 10,680,967 B2 *   6/2020   Yi ........................ H04L 47/624
11,778,683 B2    10/2023   Kanamarlapudi et al.
(Continued)

FOREIGN PATENT DOCUMENTS

CN          115315984 A        11/2022
WO     WO-2018030798 A1 *    2/2018   ........... H04B 7/0697
WO     WO-2020258018 A1 *   12/2020

OTHER PUBLICATIONS

CATT: "NR PDCP Window and Timer Mechanisms", 3gpp tsg-ran WG2 Meeting #98, R2-1704264, Hangzhou, China, May 15-19, 2017, pp. 1-4.
(Continued)

*Primary Examiner* — Intekhaab A Siddiquee
(74) *Attorney, Agent, or Firm* — Kevin M. Donnelly; Norton Rose Fulbright US LLP

(57) ABSTRACT

This disclosure provides systems, methods, and apparatuses, including computer programs encoded on computer storage media, for wireless communication. In one aspect of the disclosure, a user equipment (UE) is configured to manage a state variable (associated with a radio link control (RLC) entity or a packet data convergence protocol (PDCP) entity) that enables the UE to maintain synchronization with a base station during a communication session. For example, a base station may transmit, to the UE, a control PDU or a synchronization PDU that includes a value of a state variable maintained by a base station to enable the UE to update its state variable to maintain synchronization with the base station. Other aspects and features are also claimed and described.

30 Claims, 6 Drawing Sheets

Related U.S. Application Data

(60) Provisional application No. 63/109,784, filed on Nov. 4, 2020, provisional application No. 63/094,862, filed on Oct. 21, 2020.

(51) Int. Cl.
*H04W 36/00* (2009.01)
*H04W 56/00* (2009.01)
*H04W 72/30* (2023.01)

(52) U.S. Cl.
CPC ... *H04W 36/0016* (2013.01); *H04W 56/0015* (2013.01); *H04W 72/30* (2023.01)

(58) Field of Classification Search
USPC .......................................................... 370/312
See application file for complete search history.

(56) References Cited

U.S. PATENT DOCUMENTS

| | | | |
|---|---|---|---|
| 11,805,443 B2* | 10/2023 | Kim | ...................... H04L 1/1809 |
| 2018/0083688 A1 | 3/2018 | Agiwal et al. | |
| 2019/0053098 A1 | 2/2019 | Jo et al. | |
| 2019/0159065 A1 | 5/2019 | Kim et al. | |
| 2020/0196189 A1 | 6/2020 | Jo et al. | |
| 2020/0221526 A1 | 7/2020 | Jin et al. | |
| 2021/0105675 A1* | 4/2021 | Kim | ...................... H04W 76/27 |
| 2023/0124420 A1 | 4/2023 | Kim et al. | |

OTHER PUBLICATIONS

International Search Report and Written Opinion—PCT/US2021/071961—ISA/EPO—Feb. 23, 2022.

Mediatek Inc: "Text Proposal for RLC Procedures", 3GPP TSG-RAN2#98 Meeting, 3GPP Draft, R2-1705514 Text Proposal for RLC Procedures, 3rd Generation Partnership Project (3GPP), Mobile Competence Centre, 650, Route Des Lucioles, F-06921 Sophia-Antipolis Cedex, France, vol. RAN WG2, No. Hangzhou, China, May 15, 2017-May 19, 2017, 7 Pages, May 14, 2017 (May 14, 2017), XP051275873, Section 5.1.3 AM data transfer.

Intel Corporation: "Report of [Post109e#11][MOB] Resolving Open Issues for DAPS (Intel)", R2-2003371, 3GPP TSG-RAN WG2 Meeting #109bis Elbonia, Online, Apr. 20-30, 2020, 82 Pages.

Nokia et al., "MBS Split Bearer Configuration and PTP/PTM Switching", R2-2009314, 3GPP TSG-RAN WG2 Meeting #112 Electronic Elbonia, Nov. 2-13, 2020, 3 Pages.

Samsung Electronics: "SL PDCP Count Wrap Around Avoidance and Initial Value of RX_DELIV", R2-2003682, 3GPP TSG-RAN WG2 Meeting #109bis-e Electronic, Apr. 20-30, 2020, 4 Pages.

Samsung: "MBS Mobility for Connected Mode UEs", R2-2008061, 3GPP TSG RAN WG2 Meeting #111-e e-Meeting, Aug. 17-28, 2020, 2 Pages.

\* cited by examiner

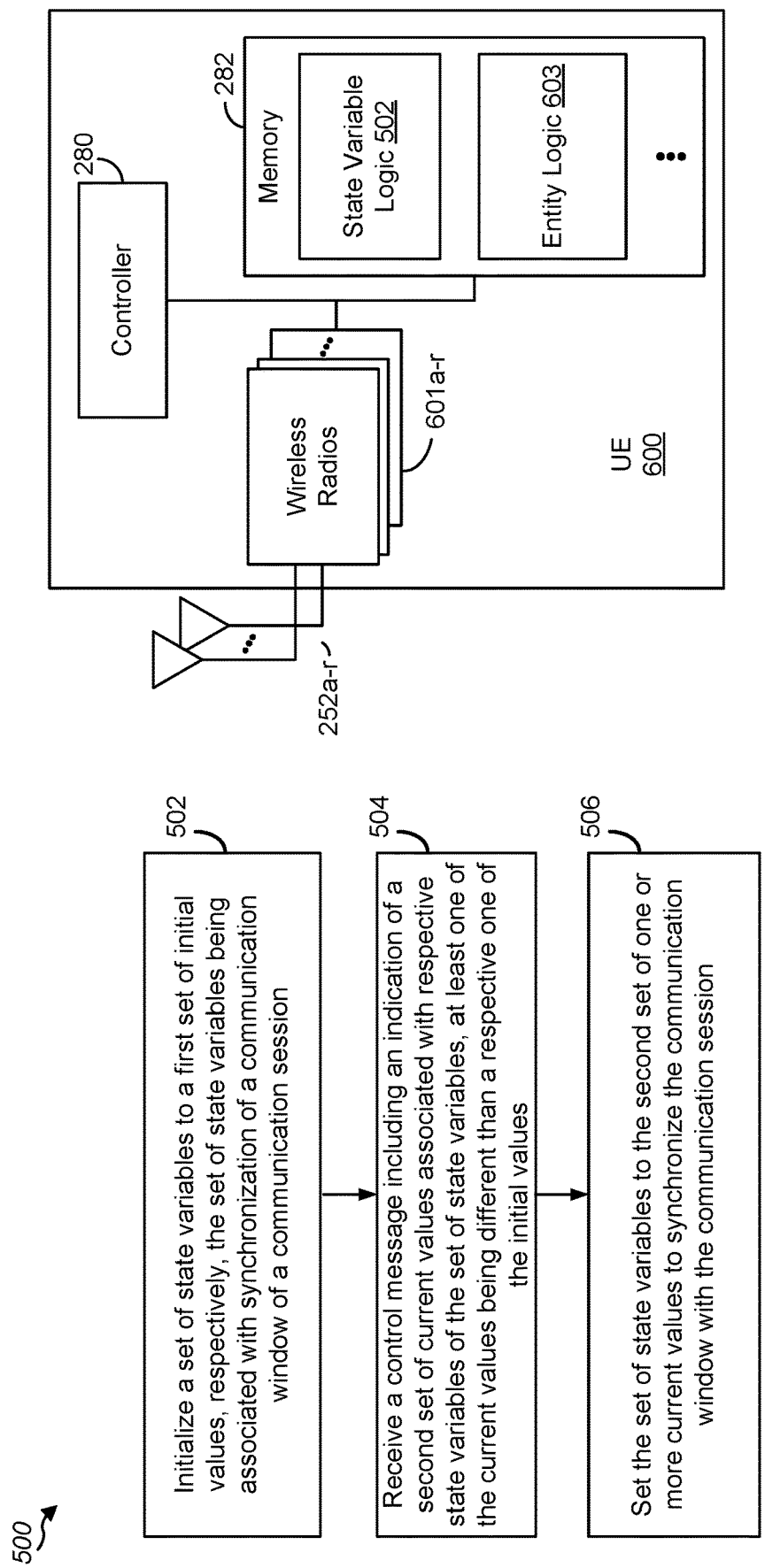

MANAGEMENT OF ONE OR MORE STATE VARIABLES ASSOCIATED WITH A COMMUNICATION WINDOW

CROSS-REFERENCE TO RELATED APPLICATIONS

The present application for Patent is a continuation of U.S. patent application Ser. No. 17/451,618, entitled, "MANAGEMENT OF ONE OR MORE STATE VARIABLES ASSOCIATED WITH A COMMUNICATION WINDOW", filed on Oct. 20, 2021, which claims the benefit of U.S. Provisional Patent Application No. 63/094,862, entitled, "MANAGEMENT OF ONE OR MORE RADIO LINK CONTROL (RLC) STATE VARIABLES," filed on Oct. 21, 2020, and U.S. Provisional Patent Application No. 63/109,784, entitled, "MANAGEMENT OF ONE OR MORE STATE VARIABLES ASSOCIATED WITH A COMMUNICATION WINDOW," filed on Nov. 4, 2020, the disclosure of each of which is hereby incorporated by reference herein in its entirety as if fully set forth below and for all applicable purposes.

TECHNICAL FIELD

Aspects of the present disclosure relate generally to wireless communication systems, and more particularly, to management of one or more state variables associated with a communication window, such as management of one or more radio link control (RLC) state variables or management of one or more packet data convergence protocol (PDCP) state variables.

DESCRIPTION OF THE RELATED TECHNOLOGY

Wireless communications systems are widely deployed to provide various types of communication content such as voice, video, packet data, messaging, broadcast, and so on. A wireless multiple-access communications system may include a number of base stations or network access nodes, each simultaneously supporting communication for multiple communication devices, which may be otherwise known as user equipment (UE). These systems may be capable of supporting communication with multiple UEs by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A UE may engage in a unicast or point-to-point (P2P) communication session with a base station. To engage in the communication session, the UE configures a radio bearer using a radio link control (RLC) entity and the RLC entity initializes state variables for RLC acknowledgement mode (AM) window management functionality. During the communication session, the UE, and specifically the RLC entity, may update the state variables to enable communication. In unicast communication, both transmit and receive RLC windows are synchronized through an RLC sliding window movement procedure without any explicit adjustment command from a transmitting RLC entity to a receiving RLC entity. If the UE attempts a radio link failure recovery procedure or the radio bearer is reconfigured during a handover procedure, the UE re-establishes the RLC entity and re-initializes the state variables to initial values in order to resume the unicast or point-to-point communication session.

The UE may also engage in a point-to-multiple (P2M) communication session, such as for the streaming of a movie or sports game, other entertainment, or mission critical information. In a P2M communication session, the UE may operate in an RLC acknowledged mode (AM) in which a base station uses a single RLC AM transmitter to transmit content to UE RLC AM receivers of multiple respective UEs. During the P2M communication session, values of the state variables for UE RLC AM window management functionality to maintain a communication window of the P2M communication session by the UE may become desynchronized with respect to the base station. As a result of the desynchronization of the state variables of the UE and the base station, the UE may discard one or more received packets of the communication session as being outside of the communication window maintained by the UE. For example, the UE may have just performed a handover operation, an RLC communication window may stall, or the UE may join an ongoing multicast session. Because the base station uses the single RLC AM transmitter to transmit content associated with a communication session to multiple UEs, the base station is unable to make an RLC transmit window adjustment to maintain synchronization on a per-UE basis. Accordingly, a UE RLC receive window that becomes desynchronized with the base station transmit RLC window may result in failure, by the UE, to receive RLC packets from the base station when these RLC packets fall outside of the UE's RLC receive window.

Additionally, when a multicast bearer (MRB) is configured for a communication session, a stack may be established that includes multiple layers, such as one or more of a service data adaptation protocol (SDAP) layer, a packet data convergence protocol (PDCP) layer, an RLC layer, a media access control (MAC) layer, or a physical (PHY) layer. For example, to engage in the communication session, the UE configures a PDCP entity and the PDCP entity initializes state variables for PDCP window management functionality. During the communication session, values of the state variables for the UE PDCP window management functionality to maintain a communication window of the P2M communication session by the UE may become desynchronized with respect to the base station. As a result of desynchronization of the state variables of the UE and the base station, the UE may discard one or more received packets of the communication session as being outside of a PDCP communication window maintained by the UE based on the state variables. For example, if the UE joins an existing multicast session, the UE may set one or more state variables associated with the PDU communication window to initial values that may be mismatched or out of synchronization with values of state variables of a PDCP entity of the base station. Accordingly, state variables of the UE used to maintain a UE PDCP communication window that become desynchronized with the state variables of the base station used to maintain a base station PDCP communication window may result in the UE failing to receive PDCP PDUs from the base station when these PDCP PDUs fall outside of the UE's PDCP communication window.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method for wireless communication performed by a user equipment (UE). The method includes initializing a set of state variables to a first set of initial values, respectively. The set of state variables are associated with synchronization of a communication window of a communication session. The method further includes receiving a control message including an indication of a second set of current values associated with respective state variables of the set of state variables. At least one of the current values is different than a respective one of the initial values. The method also includes setting the set of state variables to the second set of current values to synchronize the communication window with the communication session, and receiving or transmitting a packet associated with the communication session within the synchronized communication window.

Another innovative aspect of the subject matter described in this disclosure can be implemented in a UE. The UE includes at least one processor and a memory coupled with the at least one processor and storing processor-readable instructions that, when executed by the at least one processor, is configured to initialize a set of state variables to a first set of initial values, respectively. The set of state variables are associated with synchronization of a communication window of a communication session. The processor-readable instructions, when executed by the at least one processor, are further configured to receive a control message including an indication of a second set of current values associated with respective state variables of the set of state variables. At least one of the current values is different than a respective one of the initial values. The processor-readable instructions, when executed by the at least one processor, are further configured to set the set of state variables to the second set of current values to synchronize the communication window with the communication session, and receive or transmit a packet associated with the communication session within the synchronized communication window.

Another innovative aspect of the subject matter described in this disclosure can be implemented in an apparatus configured for wireless communication. The apparatus includes means for initializing a set of state variables to a first set of initial values, respectively. The set of state variables are associated with synchronization of a communication window of a communication session. The apparatus further includes means for receiving a control message including an indication of a second set of current values associated with respective state variables of the set of state variables. At least one of the current values is different than a respective one of the initial values. The apparatus further includes means for setting the set of state variables to the second set of current values to synchronize the communication window with the communication session, and means for receiving or transmitting a packet associated with the communication session within the synchronized communication window.

Another innovative aspect of the subject matter described in this disclosure can be implemented in a non-transitory computer-readable medium storing instructions that, when executed by a processor, cause the processor to perform operations including initializing a set of state variables to a first set of initial values, respectively. The set of state variables are associated with synchronization of a communication window of a communication session. The operations further include receiving a control message including an indication of a second set of current values associated with respective state variables of the set of state variables. At least one of the current values is different than a respective one of the initial values. The operations further include setting the set of state variables to the second set of current values to synchronize the communication window with the communication session, and receiving or transmitting a packet associated with the communication session within the synchronized communication window.

Another innovative aspect of the subject matter described in this disclosure can be implemented in a method for wireless communication performed by a base station. The method includes generating a control message including an indication of a set of values of a set of state variables associated with a communication window of a communication session. The set of values enable synchronization of the communication window and are different from a set of initial values of the set of state variables. The method further includes transmitting the control message to a UE.

Another innovative aspect of the subject matter described in this disclosure can be implemented in a base station. The base station includes at least one processor and a memory coupled with the at least one processor and storing processor-readable code that, when executed by the at least one processor, is configured to generate a control message including an indication of a set of values of a set of state variables associated with a communication window of a communication session. The set of values enable synchronization of the communication window and are different from a set of initial values of the set of state variables. The processor-readable code, when executed by the at least one processor, is further configured to initiate transmission of the control message to a UE.

Another innovative aspect of the subject matter described in this disclosure can be implemented in an apparatus configured for wireless communication. The apparatus includes means for generating a control message including an indication of a set of values of a set of state variables associated with a communication window of a communication session. The set of values enable synchronization of the communication window and are different from a set of initial values of the set of state variables. The apparatus further includes means for transmitting the control message to a UE.

Another innovative aspect of the subject matter described in this disclosure can be implemented in a non-transitory computer-readable medium storing instructions that, when executed by a processor, cause the processor to perform operations including generating a control message including an indication of a set of values of a set of state variables associated with a communication window of a communication session. The set of values enable synchronization of the communication window and are different from a set of initial values of the set of state variables. The operations further include initiating transmission of the control message to a UE.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a second label or by a dash and a second label that distinguishes among the similar components. If just the first reference label is used in the specification, the description is applicable to any one of the similar components having the same first reference label irrespective of the second reference label.

FIG. 5 is a flow diagram illustrating an example process that supports management of a state variable according to one or more aspects.

FIG. 6 is a block diagram of an example UE that supports management of a state variable according to one or more aspects.

Like reference numbers and designations in the various drawings indicate like elements.

DETAILED DESCRIPTION

Figure 1:
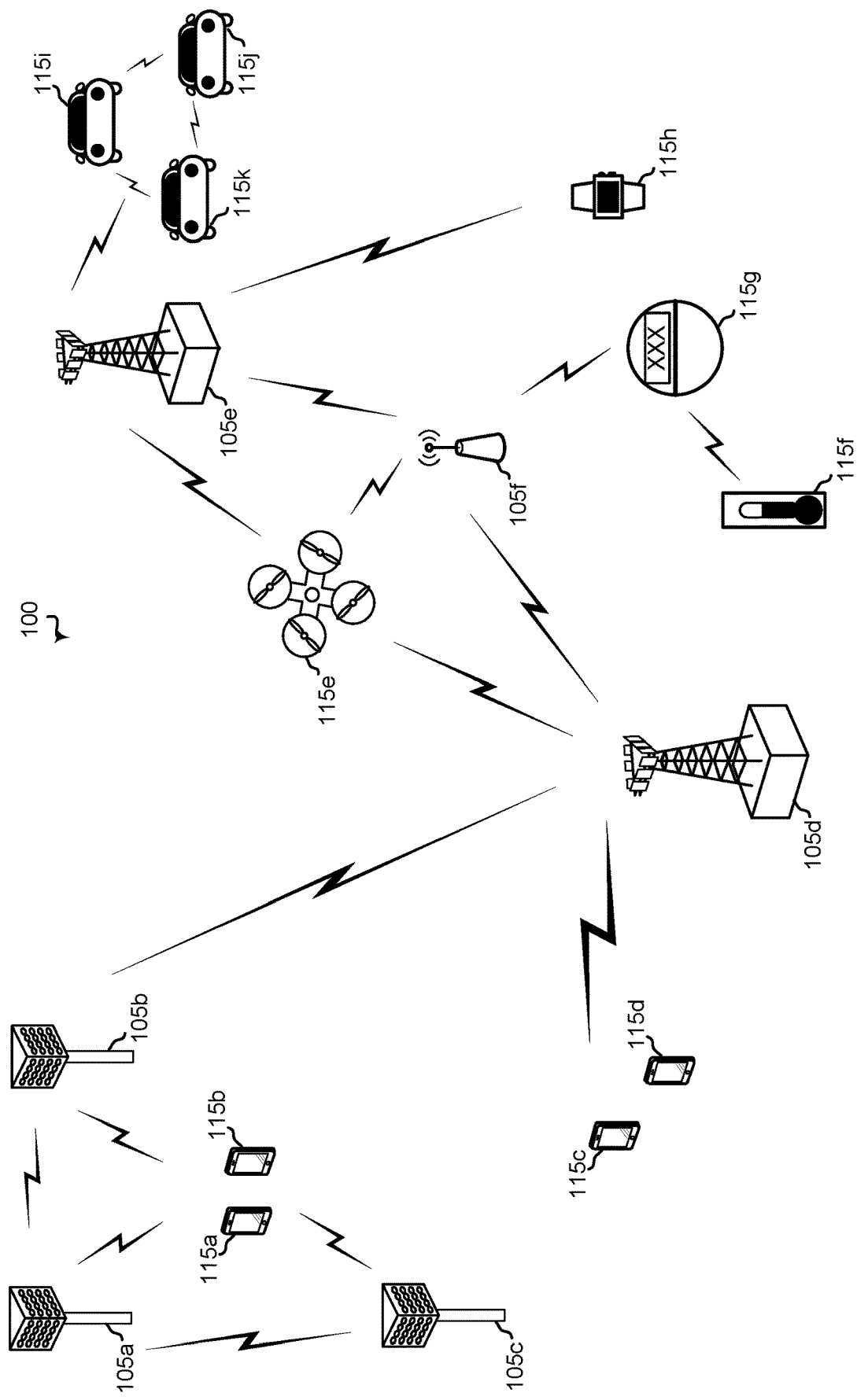
FIG. 1 is a block diagram illustrating details of an example wireless communication system according to one or more aspects.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Various aspects of the present disclosure relate to techniques that enable a user equipment (UE) to maintain synchronization of one or more state variables of the UE with one or more respective state variables of a network entity (such as a base station) during a communication session. The UE may use the state variables to maintain a communication window in synchronization with respect to a corresponding communication window maintained by the network entity based on the respective state variable of the network entity. For example, the state variables may be associated with a radio link control (RLC) entity acknowledged mode (AM) window functionality of the UE, an RLC entity unacknowledged mode (UM) window functionality of the UE, or a packet data convergence protocol (PDCP) entity window functionality. The communication may be, in various examples, a unicast communication session, a multicast communication session, or a broadcast communication session with the base station. In some aspects, the UE may establish an entity, such as the RLC entity or the PDCP entity, to join the communication session and may initialize a set of state variables associated with a communication window, such as a sliding window. For example, the set of state variables may be initialized to a set of initial values. After the UE successfully configures the entity, the base station may transmit a control message, such as a control protocol data unit (PDU), to the UE that includes a set of current values of the respective state variables maintained by the base station to enable the UE to update its state variables based on the set of current values. For example, the UE may update its state variables to be the same as the set of current values. By updating its state variables based on the set of current values, the UE is able to synchronize its communication window of the communication session with the base station. In some implementations, the control PDU may be sent without an assigned RLC sequence number (SN).

In some aspects, during the communication session, the UE may perform a handover operation from a current cell associated with the base station to a target cell associated with the base station or a different base station, and may re-establish the entity as part of the handover operation. Based on successful completion of the handover operation, the base station associated with the target cell may transmit a control PDU (without an assigned RLC SN) to the UE to enable the UE to update its state variables and maintain synchronization between the UE and the base station associated with the target cell.

In some aspects, the base station may transmit one or more synchronization (synch) PDUs to the UE during the communication session. For example, the base station may transmit the synchronization PDUs periodically. In some examples, each synchronization PDU may include or be transmitted with an RLC SN and may include one or more current values of one or more of the state variables maintained by the base station to enable the UE to determine whether or not to update its respective state variables to synchronize the communication window of the communication session with the base station. Additionally, if the UE does not receive, using the communication window, a packet associated with the entity within a time period, the UE may determine that the communication window is "stalled" and the UE may subsequently re-establish the entity, which may, in turn, cause an interruption to the communication session by the UE.

Particular implementations of the subject matter described in this disclosure can be implemented to realize one or more of the following potential advantages. By providing a control messages that includes the current value of a state variable maintained by the base station to the UE, the UE may update its state variables to manage its communication window to maintain synchronization with the base station and experience fewer interruptions during the communication session, thereby improving user experience. In some implementations, the control may be sent without an assigned RLC SN, which may reduce communication overhead. Additionally, in implementations where the base station transmits one or more synchronization PDU, the one or more synchronization PDUs may enable the UE to maintain synchronization of the communication window with the base station and avoid the communication window becoming stalled.

In various implementations, the techniques, procedures and apparatus disclosed herein may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km$^2$), ultra-low complexity (such as ~10 s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 millisecond (ms)), and users with wide ranges of mobility or lack thereof; and (3) with enhanced mobile broadband including extreme high capacity (such as ~10 Tbps per km2), extreme data rates (such as multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115i-115k communicating with the macro base station 105e.

Figure 2:
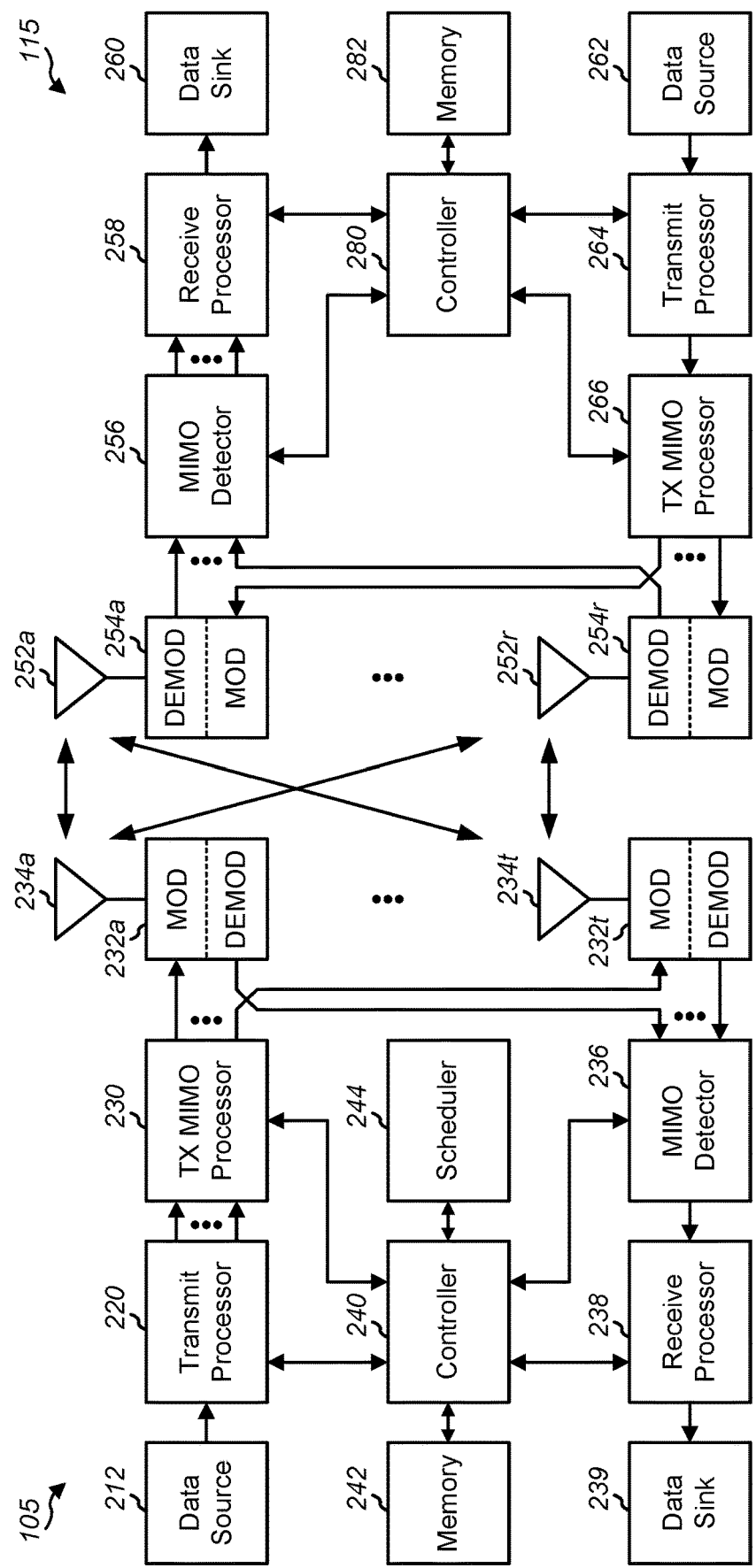
FIG. 2 is a block diagram illustrating examples of a base station and a user equipment (UE) according to one or more aspects.

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller 240.

The controllers 240 and 280 may direct the operation at the base station 105 and the UE 115, respectively. The controller 240 or other processors and modules at the base station 105 or the controller 280 or other processors and modules at the UE 115 may perform or direct the execution of various processes for the techniques described herein, such as to perform or direct the execution illustrated in FIGS. 5 and 7, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

Various aspects of the present disclosure relate to techniques that enable a user equipment (UE) to maintain synchronization of a state variable of the UE with a state variable of a network (base station) during a communication session. For example, the state variable may be associated with a radio link control (RLC) entity acknowledged mode (AM) window state variable of the UE or a packet data convergence protocol (PDCP) entity window state variable. In some aspects, the UE may establish an entity, such as the RLC entity or the PDCP entity, to join the communication session, such as a unicast communication session, a multicast communication session, or a broadcast communication session with the base station. Additionally, the UE may initialize one or more state variables associated with a communication window, such as a sliding window. Based on the UE successfully configuring the entity or a mode of the RLC entity, such as a UM mode or an AM mode, the base station may transmit a control protocol data unit (PDU) to the UE that includes a set of one or more current values of the one or more state variables (maintained by the base station) to enable the UE to update its state variables to synchronize the communication window of the communication session with the base station. In some implementations, the control PDU may be sent without an RLC sequence number (SN) assigned.

In some aspects, during the communication session, the UE may perform a handover operation to a target cell associated with the base station and may re-establish the entity. Based on completion of the handover operation, the base station associated with the target cell may transmit a control PDU (without an RLC SN assigned) to the UE to enable the UE to manage its state variables and maintain synchronization between the entity of the UE and an entity of the base station associated with the target cell.

In some aspects, the base station may transmit one or more synchronization (synch) PDUs to the UE during the communication session. For example, the base station may periodically transmit synchronization PDUs to the UE. In some implementations, each synchronization PDU may include or be transmitted with an RLC SN and may include one or more current values of the one or more state variables (maintained by the base station) to enable the UE to determine whether or not to update its state variables to synchronize a communication window of the communication session with the base station to avoid dropping received packets. Additionally, if the UE does not receive a valid packet associated with the entity, such as the RLC entity or the PDCP entity, within a time period, the communication window is determined to be "stalled" and the UE re-establishes the entity, which may cause an interruption to receipt of the communication session by the UE. According, the one or more synchronization PDUs may enable the UE to maintain synchronization of the communication window with the base station and avoid the communication window becoming stalled.

Particular implementations of the subject matter described in this disclosure can be implemented to realize one or more of the following potential advantages. In some aspects, the present disclosure presents techniques for management of one or more state variables, such as state variables associated with an RLC AM entity, and RLC UM entity, or a PDCP entity. For example, a base station may maintain various state variables and provide a value of each of one or more of the state variables to a UE to enable the UE to maintain synchronization with the base station. For example, the value of a state variable may enable the UE to synchronize with the base station based on the UE establishing the RLC AM entity or the PDCP entity and joining a communication session, or based on the UE performing a handover operation and re-establishing the RLC AM entity, the RLC UM entity, or the PDCP entity. In addition to providing the value of the state variable based on the UE joining the communication session or performing a handover operation, the base station may also provide the value of the state variable at one or more other times during the communication session. By providing the value of a state variable maintained by the base station to the UE, the UE may manage synchronization with the base station and experience fewer interruptions during the communication session, thereby improving user experience.

Figure 3:
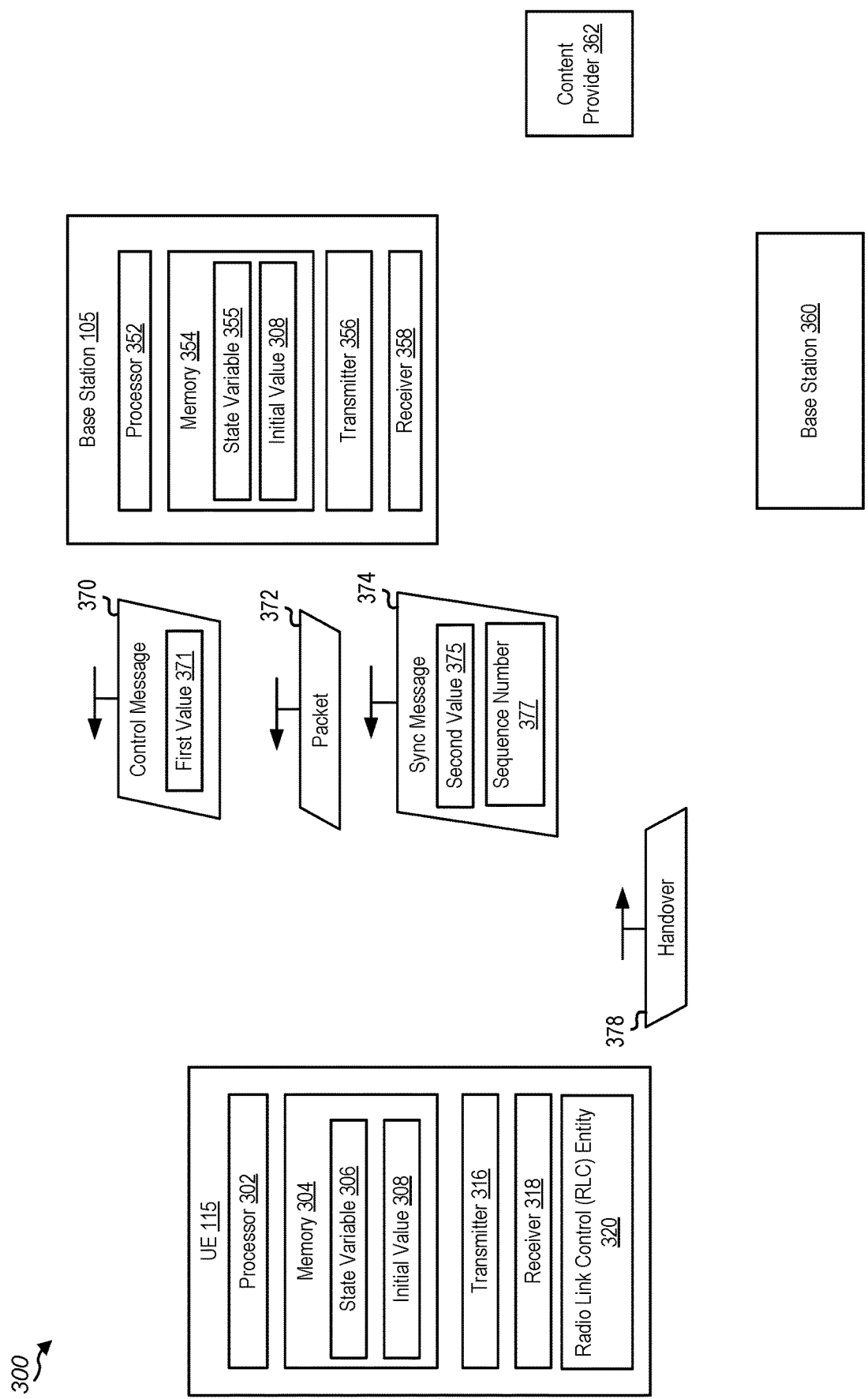
FIG. 3 is a block diagram illustrating an example wireless communication system that supports management of a state variable according to one or more aspects.

FIG. 3 is a block diagram of an example wireless communications system 300 that supports management of a state variable according to one or more aspects. In some examples, the wireless communications system 300 may implement aspects of the wireless network 100. The wireless communications system 300 includes the UE 115, the base station 105, a base station 360, and a content provider 352. Although one UE 115 and two base station 105 and 360 are illustrated, in some other implementations, the wireless communications system 300 may generally include multiple UEs 115, and may include one base station or more than two base stations. In some implementations, the base station 105 may be associated with a first cell and the base station 360 may be associated with a second cell. In some other implementations, the base station 105 is associated with a first cell and a second cell.

The UE 115 can include a variety of components (such as structural, hardware components) used for carrying out one or more functions described herein. For example, these components can include one or more processors 302 (hereinafter referred to collectively as "the processor 302"), one or more memory devices 304 (hereinafter referred to collectively as "the memory 304"), one or more transmitters 316 (hereinafter referred to collectively as "the transmitter 316"), one or more receivers 318 (hereinafter referred to collectively as "the receiver 318"), and an RLC entity 320. The processor 302 may be configured to execute instructions stored in the memory 304 to perform the operations described herein. In some implementations, the processor 302 includes or corresponds to one or more of the receive processor 258, the transmit processor 264, and the controller 280, and the memory 304 includes or corresponds to the memory 282.

The memory 304 includes or is configured to store one or more state variables 306 (hereinafter referred to collectively as "the state variable 306"), one or more initial values 308 (hereinafter referred to collectively as "the initial value 308"). The state variable 306 may be associated with operation of or communication via the RLC entity 320, such as a communication window. For example, the state variable 306 may include a window size, a lower edge value, an upper edge value, or a combination thereof.

The state variable 306 may include or correspond to a data transfer, such as a UM data transfer or an AM data transfer. For example, the UE 115 may maintain a current value of the state variable 306 during a communication session. In some implementations, the UE 115 may initiate a communication session and set the state variable 306 to the initial value 308. For example, the UE 115 may set the state variable 306 to the initial value 308 based on establishment or re-establishment of the RLC entity 320. Additionally, or alternative, during the communication session, the UE 115 may adjust the value of the state variable 306 as describe further herein.

The state variable 306 may be set to a non-negative integer. As an illustrative, non-limiting example, the state variable 306 is described herein with reference to an AM data transfer. Although described herein with reference to the AM data transfer, it is noted that such description is not intended to be limiting and, in some implementations, the state variables 306 may be associated with a UM data transfer. In association with the AM data transfer, the state variables 306 may have a value from 0 to 4095 for a 12 bit SN or from 0 to 262143 for an 18 bit SN. The UE 115 may perform one or more arithmetic operations on the state variable 306 related to the AM data transfer based on an AM modulus, such as. final value=[value from arithmetic operation] modulo 4096 for 12 bit SN and 262144 for 18 bit SN. It is noted that when performing arithmetic comparisons of the state variable 306 or a SN value, a modulus base may be used.

A TX_Next_Ack and an RX_Next may be assumed as the modulus base at the transmitting side and receiving side of the RLC entity 320 (such as an AM RLC entity), respectively. This modulus base may be subtracted from all the values involved, and then an absolute comparison may be performed. To illustrate, RX_Next<=SN<RX_Next+AM_Window_Size may be evaluated as [RX_Next−RX_Next] modulo $2^{[sn\text{-}FieldLength]}$<=[SN−RX_Next] modulo $2^{[sn\text{-}FieldLength]}$<[RX_Next+AM_Window_Size−RX_Next] modulo $2^{[sn\text{-}FieldLength]}$) where sn-FieldLength is 12 or 18 for 12 bit SN and 18 bit SN, respectively.

The transmitting side of the RLC entity 320, such as an AM RLC entity, may maintain the state variable 306, which may include a first state variable, a second state variable, a third state variable, or a combination thereof. For example, the first state variable, the second state variable, and the third state variable may include an acknowledgement state variable (TX_Next_Ack), a send stat variable (TX_Next), and a poll send state variable (POLL_SN), respectively. The first state variable, such as the acknowledgement state variable (TX_Next_Ack), may have a value of the SN of the next RLC SDU for which a positive acknowledgment is to be received in-sequence, and may serves as the lower edge of the transmitting window. The first state variable may initially set to 0, and may updated whenever the RLC entity receives a positive acknowledgment for an RLC SDU with SN=TX_Next_Ack. The second state variable, such as the send state variable (TX_Next), may have a value of the SN to be assigned for the next newly generated acknowledge mode data (AMD) PDU. The second state variable may initially be set to 0, and may be updated whenever the RLC entity constructs an AMD PDU with SN=TX_Next and includes an RLC SDU or the last segment of a RLC SDU. The third state variable, such as the poll send state variable (POLL_SN), may have a value of the highest SN of the AMD PDU among the AMD PDUs submitted to lower layer when POLL_SN is set. The third state variable may initially be set to 0.

Additionally, the transmitting side of an RLC entity, such as an AM RLC entity, may maintain one or more counters. The one or more counters may include a first counter, a second counter, a third counter, or a combination thereof. The first counter, the second counter, and the third counter may include a PDU_WITHOUT_POLL counter, a BYTE_WITHOUT_POLL counter, a RETX_COUNT counter, respectively. The first counter, such as the PDU_WITHOUT_POLL counter may initially be set to 0 and may be configured to count a number of AMD PDUs sent since a most recent poll bit was transmitted. The second counter, such as the BYTE_WITHOUT_POLL counter, may initially be set to 0, and may be configured to count a number of data bytes sent since the most recent poll bit was transmitted. The third counter, such as the RETX_COUNT counter, may be configured to count a number of retransmissions of an RLC service data unit (SDU) or RLC SDU segment. In some implementations, one RETX_COUNT counter may be maintained per RLC SDU.

The receive side of the RLC entity 320 may maintain the state variable 306, which may include a fourth state variable, a fifth state variable, a sixth state variable, a seventh state variable, or a combination thereof. For example, the fourth state variable, the fifth state variable, the sixth state variable, and the seventh state variable may include a receive state variable (RX_Next), a t-Reassembly state variable (RX_Next_Status_Trigger), a maximum STATUS transmit state variable (RX_Highest_Status), and a highest received state variable (RX_Next_Highest), respectively. The fourth state variable, such as the receive state variable (RX_Next), may have a value of the SN following the last in-sequence completely received RLC SDU, and may serve as a lower edge of a receiving window. The fourth state variable may initially set to 0, and may be updated whenever the RLC entity 320 receives an RLC SDU with SN=RX_Next. The fifth state variable, such as the t-Reassembly state variable (RX_Next_Status_Trigger), may have a value of the SN following the SN of the RLC SDU which triggered t-Reassembly. The sixth state variable, such as the maximum STATUS transmit state variable (RX_Highest_Status), may have a highest possible value of the SN which can be indicated by "ACK_SN" when a STATUS PDU needs to be constructed. The sixth state variable may initially be set to 0. The seventh state variable, such as the highest received state variable (RX_Next_Highest) may have a value of the SN following the SN of the RLC SDU with the highest SN among received RLC SDUs. The seventh state variable may initially be set to 0.

The transmitter 316 is configured to transmit reference signals, control information and data to one or more other devices, and the receiver 318 is configured to receive references signals, synchronization signals, control information and data from one or more other devices. For example, the transmitter 316 may transmit signaling, control information and data to, and the receiver 318 may receive signaling, control information and data from, the base station 105. In some implementations, the transmitter 316 and the receiver 318 may be integrated in one or more transceivers. Additionally or alternatively, the transmitter 316 or the receiver 318 may include or correspond to one or more components of the UE 115 described with reference to FIG. 2. For example, the transmitter 316 may include or correspond to the antennas 234a-t, the modulator and demodulators 232a-t, the transmit processor 220, the TX MIMO processor 230, or a combination thereof. As another example, the receiver 318 may include or correspond to the antennas 234a-t, the modulator and demodulators 232a-t, the MIMO detector 236, the receive processor 238, or a combination thereof.

The RLC entity 320 is configured to set and update the state variable 306. The UE 115 may establish the RLC entity 320 based on an upper layer request. For example, the UE 115 may establish the RLC entity 320 and may set the state variable 306 to the initial value 308. Additionally, the UE 115 may re-establish the RLC entity 320 based on an upper layer re-establishment request. For example, to re-establish the RLC entity 320, the UE may discard all RLC SDUs, RLC SDU segments, and RLC PDUs, if any. Additionally, or alternatively, to re-establish the RLC entity 320, the UE 115 may stop and reset one or more timers, reset one or more state variables to their initial values, or a combination thereof. To illustrate, the UE 115 may stop and reset all timers and reset all state variables to their initial values. Additionally, the RLC entity 320 may be configured to have a mode, such as a transparent mode (TM), an unacknowledged mode (UM), or an AM. In some implementations, the state variables 306 may be associated with a communication window used by the RLC entity 320 in the UM, such as an RLC UM entity. In some other implementations, the state variables 306 may be associated with a communication window used by the RLC entity 320 in the AM, such as an RLC AM entity.

The base station 105 can include a variety of components (such as structural, hardware components) used for carrying out one or more functions described herein. For example, these components can include one or more processors 352 (hereinafter referred to collectively as "the processor 352"), one or more memory devices 354 (hereinafter referred to collectively as "the memory 354"), one or more transmitters 356 (hereinafter referred to collectively as "the transmitter 356"), and one or more receivers 358 (hereinafter referred to collectively as "the receiver 358"). The processor 352 may be configured to execute instructions stored in the memory 354 to perform the operations described herein. In some implementations, the processor 352 includes or corresponds to one or more of the receive processor 238, the transmit processor 220, and the controller 240, and the memory 354 includes or corresponds to the memory 242.

The memory 354 includes or is configured to store one or more state variables 355 (hereinafter referred to collectively as "the state variable 355") and the initial value 308. The state variable 355 may include or correspond to the state variable 306. For example, the base station 105 may maintain a current value of the state variable 355 during a communication session. In some implementations, the base station 105 may initiate a communication session and set the state variable 355 to the initial value 308. Additionally, or alternative, during the communication session, the base station 105 may adjust the value of the state variable 355 such that the base station 105 maintains a current value of the state variable 355.

The transmitter 356 is configured to transmit reference signals, synchronization signals, control information and data to one or more other devices, and the receiver 358 is configured to receive reference signals, control information and data from one or more other devices. For example, the transmitter 356 may transmit signaling, control information and data to, and the receiver 358 may receive signaling, control information and data from, the UE 115. In some implementations, the transmitter 356 and the receiver 358 may be integrated in one or more transceivers. Additionally or alternatively, the transmitter 356 or the receiver 358 may include or correspond to one or more components of base station 105 described with reference to FIG. 2. For example, the transmitter 356 may include or correspond to the antennas 252a-r, the modulator and demodulators 254a-r, the transmit processor 264, the TX MIMO processor 266, or a combination thereof. As another example, the receiver 358 may include or correspond to the antennas 252a-r, the modulator and demodulators 254a-r, the MIMO detector 256, the receive processor 258, or a combination thereof.

The base station 360 may include one or more components as described with reference to the base station 105. Additionally, or alternatively, the base station 360 may be configured to perform one or more operations as described with reference to the base station 105.

The content provider 362 is configured to provide content, such as video content, audio content, or a combination thereof. The content may be associated with a communication session, such as a communication session established with the UE 115. For example, the UE 115 may establish a communication session, such as a unicast communication session, a multicast communication session, or a broadcast communication session, with the content provider 352 via one or more base stations, such as the base station 105 or the base station 360. Although the wireless communications system 300 is described as the content provider 362 be separate from the base station 105, in other implementations, the base station 105 may include the content provider 362 or the content of the content provider 262. Additionally, although the wireless communications system 300 is described as including the content provider 362, in other implementations, the wireless communication system 300 may not include the content provider 362.

In some implementations, the wireless communications system 300 implements a 5G New Radio (NR) network. For example, the wireless communications system 300 may include multiple 5G-capable UEs 115 and multiple 5G-capable base stations 105, such as UEs and base stations configured to operate in accordance with a 5G NR network protocol such as that defined by the 3GPP.

During operation of the wireless communications system 300, the UE 115 may establish the RLC entity 320 and configure a mode of the RLC entity 320. For example, to configure the RLC entity, the UE 115 may establish the RLC entity 320 to join an ongoing communication session, such as a unicast communication session, a multicast communication session, or a broadcast communication. In some implementations, the communication session includes a multicast data session. Additionally, or alternatively, to establish the RLC entity, the UE 115 may set the state variable 306 to the initial value 308. The state variable 306 may be associated with a communication window, such as a Tx window, an Rx window, or a combination thereof, of a communication session. For example, the state variable may include a window size of the communication window, a lower edge value for the communication window, an upper edge value for the communication window, at least one of the first through seventh state variables, or a combination thereof. The initial value 308 may be based on a standard, equal to zero, or a combination thereof. Additionally, or alternatively, the initial values 308 may be included in or indicated by a radio resource control (RRC) message that is transmitted by the base station 105 and received by the UE 115. In some implementations, the UE 115 may initiate establishment of the communication session after configuring the RLC entity 320.

In some implementations, the base station 105 may also establish a RLC entity that is associated with the communication session. In some implementations, a transmit RLC entity of the base station 105 may be synchronized with the RLC entity 320, such as a receive RLC entity, of the UE 115. Additionally, or alternatively, a receive RLC entity of the base station 105 may be synchronized with the RLC entity 320, such as a transmit RLC entity, of the UE 115. Synchronization of an RLC entity of the base station 105 and the RLC entity 320 of the UE may include synchronization of an RLC sliding window movement in time such the an RLC sliding window of the base station 105 and an RLC sliding window of the UE 115 entirely or at least partially overlap in time.

After configuration of the RLC entity 320, the base station 105 may generate a control message 370, such as an RLC control message. The control message 370 may include an indication of a first value 371 of the state variable 355 maintained by the base station 105 and associated with a communication window of the communication session. The first value 371 may enable synchronization of the communication window of the communication window of the UE 115 and may be different than the initial value 308, a value of the state variable 306, or both. After generation of the control message 370, the base station 105 transmits the control message 370 to the UE 115. In some implementations, the control message 370, such as the first value 371, may include or indicate the initial value 308.

In some implementations, the control message 370 includes a first RLC PDU sent to the UE 115 after establishment of the RLC entity 320. For example, the control message 370 may include a synchronization PDU that includes the indication. In some implementations, the control message 370 may be included in an RRC message. Additionally, or alternatively, the control message 370 may include a control PDU type (CPT) filed that includes one or more bits. The one or more bits may indicate the type as an RLC control PDU, or a synchronization PDU, that includes the first value 371. Additionally, or alternatively, the control message 370 transmitted by the base station 105 may be independent of an RLC SN. Stated in another manner, the control message 370 may not include an RLC SN.

The UE 115 receives the control message 370 including the indication of the first value 371. The UE 115 may set the state variable 306 based on control message 370. For example, the UE 115 may set the state variable 306 from the initial value 308, or a current value, to the first value 371. Setting the state variable 306 to the first value 371 may synchronize the communication window (associated with the RLC entity 320) of the UE 115 with the base station 105. After setting the state variable 306, the UE 115 may receive or transmit a packet associated with the communication session within the communication window based on the state variable 306. To illustrate, the UE 115 may receive a packet 372 associated with the communication session from the base station 105.

In some implementations, the UE 115 may perform a handover operation from the base station 360 to the base station 115. For example, the UE 115 may send a handover request 378 to the base station 360 to initiate the handover operation from a first cell associated with the base station 360 to a second cell, such as a target cell, associated with the base station 105. To illustrate, the UE 115 may have established the RLC entity and joined the communication session the base station 360 and may perform the handover operation to continue the communication session via the base station 105.

After the handover operation, the UE 115 may re-establishing the RLC entity 320, such as an RLC UM entity or an RLC AM entity, based on completion of the handover operation to the target cell, such as the base station 105. The UE 115 may receive control message 370, such as an RLC control message, after the RLC entity 320 is re-established. For example, in some implementations, the UE 115 may receive initial state variables, such as initial value 308, in an RRC message. In some implementations, the control message 370 transmitted by the base station 105 after completion of the handover operation may include an RLC data PDU that includes an assigned RLC SN. Alternatively, the control message 370 transmitted by the base station 105 after completion of the handover operation may be independent of an RLC SN. Stated in another manner, the control message 370 may not include an RLC SN. In some implementations, after the RLC entity 320 is re-established, the UE 115 may receive a message that includes a SN and may determine or generate state variables based on the received SN.

Based on the control message 370 received after completion of the handover operation, the UE 115 may set the state variable 306 based on the received control message 370. After setting the state variable 306, the UE 115 may receive or transmit a packet associated with the communication session within the communication window based on the state variable 306. To illustrate, the UE 115 may receive a packet 372 associated with the communication session from the base station 105.

In some implementations, the base station 105 may determine whether the UE 115 joined the communication session or completed a handover operation. The base station 105 may generate and transmit the control message 370 the UE 115 based on a determine that the UE joined the communication session or completed a handover operation.

In some implementations, the base station 105 may generate one or more synchronization (sync) messages, such as one or more synchronization PDUs, during the communication session. For example, the one or more synchronization messages may include a representative synchronization message 374. Each of the one or each of the one or more synchronization message may include a respective indication of a corresponding update of the state variable 306 of the UE 115, a respective sequence number, or a combination thereof. To illustrate, the synchronization message 374 may include a second value 375 of the state variable 355 maintained by the base station 105 and associated with a communication window of the communication session. The second value 375 may enable synchronization of the communication window of the communication window of the UE 115 and may be different than a value of the state variable 306. For example, the UE 115 may experience fading conditions and the synchronization message 374 including the second value 375 may enable the UE 115 to quickly adjust state variable 306 and come back in synchronization with the ongoing communication session, such as a multicast service. In some implementations, the synchronization message 374 may include a SN number 377.

After generation of a synchronization message, such as the synchronization message 374, the base station 105 may transmit the synchronization message to the UE 115. The UE 115 may receive the synchronization message and determine whether or not to update the state variable 306 based on indication of the corresponding update of the state variable 306. For example, the UE 115 may determine to update the state variable 306 and may update the state variable based on the received synchronization message, such as based on the received second value 375. In some implementations, the base station 105 periodically transmits a synchronization message to the UE 115 to enable the UE 115 to maintain synchronization of the communication window (of the UE 115) with the base station 105. In some implementations, the sync message 374 may be a control PDU included in or coupled to, such as piggyback to, a data PDU.

Although synchronization of the command window has been described and being maintained based on the control message 370 and the synchronization message 374, either of the control message 370 or synchronization message 374 may be utilized without the other. Additionally, although the control message 370 has been described as being provided based on the UE 115 joining the communications session and completing a handover operation, in other implementations, the control message 370 may be provided for one of joining the communications session and completing the handover operation, but not the other.

As described with reference to FIG. 3, the present disclosure provides techniques for management of state variable 306. In some aspects, the present disclosure provides management of the state variable 306 by providing the control message 370 that includes the first value 371. For example, the control message 370 may be provided based on establishment or re-establishment of the RLC entity 320 at the UE 115. Additionally, or alternatively, the present disclosure provides management of the state variable 306 by providing the synchronization message 374 that includes the second value 375. Each of the control message 370 and the synchronization message 374 enable the UE 115 to maintain synchronization with the base station 115. By maintaining synchronization between the UE 115 and the base station 105, the UE 115 may experience fewer interruptions during the communication session and thereby provide a positive user experience.

Figure 4:
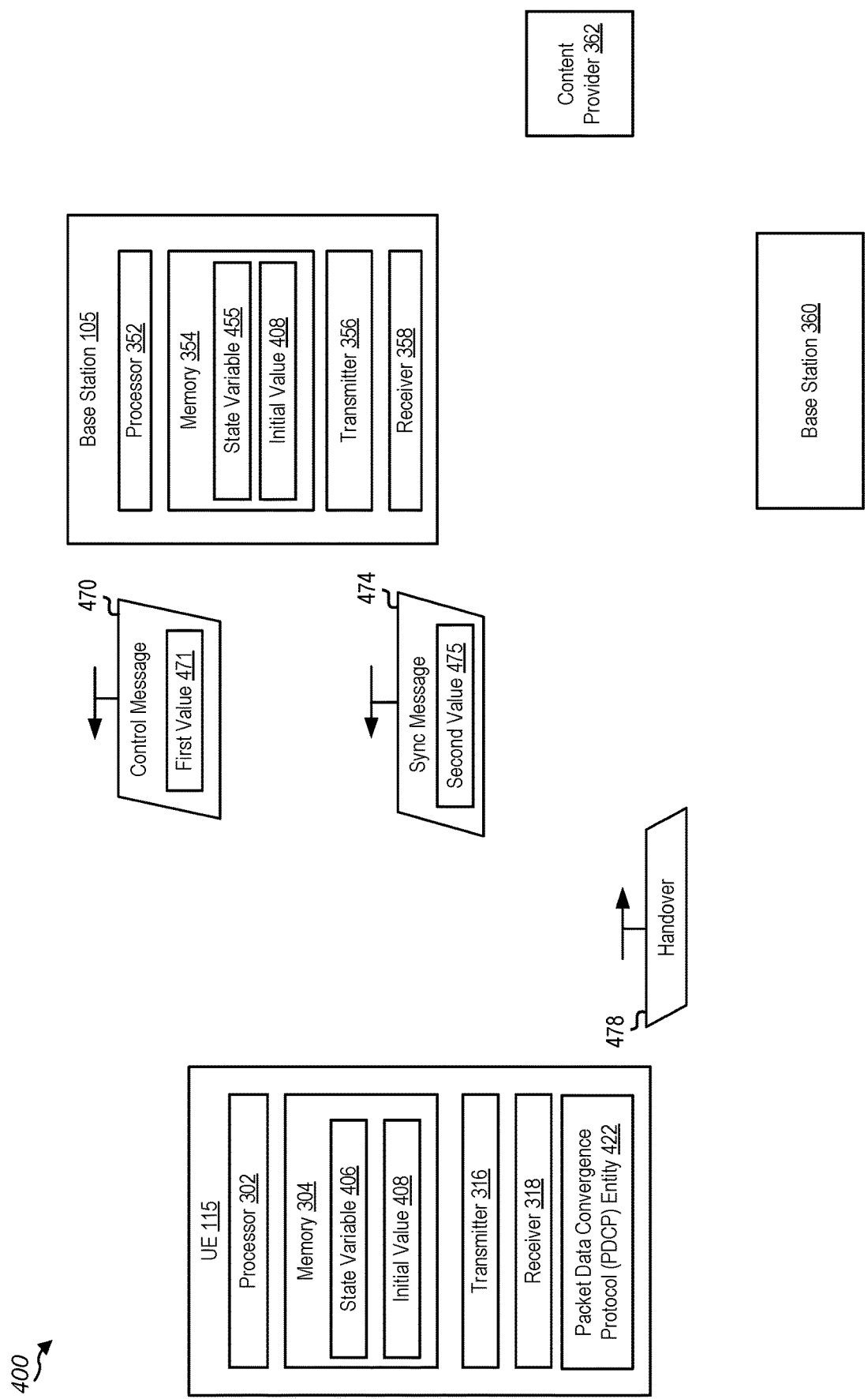
FIG. 4 is a block diagram illustrating another example wireless communication system that supports management of a state variable according to one or more aspects.

FIG. 4 is a block diagram of an example wireless communications system 400 that supports management of a state variable according to one or more aspects. In some examples, the wireless communications system 400 may implement aspects of the wireless network 100 or the wireless communications system 300. The wireless communications system 400 includes the UE 115, the base station 105, a base station 360, and a content provider 352. Although one UE 115 and two base station 105 and 360 are illustrated, in some other implementations, the wireless communications system 400 may generally include multiple UEs 115, and may include one base station or more than two base stations. In some implementations, the base station 105 may be associated with a first cell and the base station 360 may be associated with a second cell. In some other implementations, the base station 105 is associated with a first cell and a second cell.

The UE 115 can include a variety of components (such as structural, hardware components) used for carrying out one or more functions described herein. For example, these components can include the processor 302, the memory 304, the transmitter 316, the receiver 318, and a PDCP entity 422. The processor 302 may be configured to execute instructions stored in the memory 304 to perform the operations described herein. In some implementations, the processor 302 includes or corresponds to one or more of the receive processor 258, the transmit processor 264, and the controller 280, and the memory 304 includes or corresponds to the memory 282.

The memory 304 includes or is configured to store one or more state variables 406 (hereinafter referred to collectively as "the state variable 406"), one or more initial values 408 (hereinafter referred to collectively as "the initial value 408"). In some implementations, the state variable 406 and the initial value 408 may include or correspond to the state variable 306 and the initial value 308, respectively. The state variable 406 may be associated with operation of or communication via the PDCP entity 422, such as a communication window. For example, the state variable 406 may include a window size, a lower edge value, an upper edge value, or a combination thereof.

The state variable 406 may include or correspond to a data transfer, such as an PDU transfer associated with a PDCP layer. For example, the UE 115 may maintain a current value of the state variable 406 during a communication session. In some implementations, the UE 115 may initiate a communication session and set the state variable 406 to the initial value 408. For example, the UE 115 may set the state variable 406 to the initial value 408 based on establishment or re-establishment of the PDCP entity 422. Additionally, or alternative, during the communication session, the UE 115 may adjust the value of the state variable 406 as describe further herein.

The state variable 406 may be set to a non-negative integer. As an illustrative, non-limiting example, state variable 406 is described herein with reference to a PDCP PDU data transfer. State variables 406 may have a value from 0 to an upper limit, such as [2$^{32}$−1]. Additionally, or alternatively, PDCP data PDUs may be numbered integer sequence numbers (SNs), which cycle through a field: 0 to [2[pdcp-SN-size]−1]. In some implementations, pdcp-SN-size may be based on or equal to the upper limit.

The transmitting side of the PDCP entity 422 may maintain the state variable 406, which may include a first state variable. For example, the first state variable may include a transmit (Tx) next state variable (TX_Next). The first state variable, such as the Tx next state variable (TX_Nex), may have a value that indicates a count value of a next PDCP SDU to be transmitted. The first state variable may initially be set to 0.

The receive side of the PDCP entity 422 may maintain the state variable 306, which may include a second state variable, a third stat variable, a fourth state variable, or a combination thereof. For example, the second state variable, the third state variable, and the fourth state variable may include a receive (Rx) state variable (RX_Next), an Rx deliver state variable (RX_DELIV), and an Rx reorder state variable (RX_REORD), respectively. The second state variable, such as the Rx state variable (RX_Next), may have a value that indicates a count of a next PDCP SDU expected to be received. The second state variable may initially set to 0. The third state variable, such as the Rx deliver state variable (RX_DELIV), may have a value that indicates a count value of the first PDCP SDU not delivered to the upper layers, but still waited for. The third state variable may be initially set to 0. The fourth state variable, such as the Rx reorder state variable (RX_REORD), may have a value that indicates a count associated with a PDCP data PDU which triggered reordering, such as t-reordering.

The PDCP entity 422 is configured to set and update the state variable 406. The UE 115 may establish the PDCP entity 422 as part of a stack. For example, the UE 115 may establish the stack or the PDCP entity 422 based on an upper layer request. The stack may include or correspond to a service data adaptation protocol (SDAP) layer, packet data convergence protocol (PDCP) layer, an RLC layer, a media access control (MAC) layer, or a physical (PHY) layer. To illustrate, the UE 115 may establish the PDCP entity 422 and may set the state variable 306 to the initial value 308. Additionally, or alternatively, the UE 115 may also establish the RLC entity 320 based on the upper layer request. In some implementation, the UE 115 may additionally re-establish the PDCP entity 422 (or the RLC entity 320) based on an upper layer re-establishment request.

The base station 105 can include a variety of components (such as structural, hardware components) used for carrying out one or more functions described herein. For example, these components can include the processor 352, the memory 354, the transmitter 356, and the receiver 358. The processor 352 may be configured to execute instructions stored in the memory 354 to perform the operations described herein. In some implementations, the processor 352 includes or corresponds to one or more of the receive processor 238, the transmit processor 220, and the controller 240, and the memory 354 includes or corresponds to the memory 242.

The memory 354 includes or is configured to store one or more state variables 455 (hereinafter referred to collectively as "the state variable 455") and the initial value 408. The state variable 455 may include or correspond to the state variable 355. Additionally, or alternatively, the state variable 455 may include or correspond to the state variable 406. For example, the base station 105 may maintain a current value of the state variable 455 during a communication session. In some implementations, the base station 105 may initiate a communication session and set the state variable 455 to the initial value 408. Additionally, or alternative, during the communication session, the base station 105 may adjust the value of the state variable 455 such that the base station 105 maintains a current value of the state variable 455.

In some implementations, the base station 105 may include a PDCP entity. The PDCP entity may include or correspond to the PDCP entity 422. The transmitting PDCP entity of the base station 105 may be configured to perform operations associated with transmission of data to the receiving PDCP entity, such as the PDCP entity 422, of the UE 115. Additionally, or alternatively, the receiving PDCP entity of the base station 105 may be configured to perform operations associated with reception of data from the transmitting PDCP entity, such as the PDCP entity 422, of the UE 115.

In some implementations, the wireless communications system 400 implements a 5G NR network. For example, the wireless communications system 400 may include multiple 5G-capable UEs 115 and multiple 5G-capable base stations 105, such as UEs and base stations configured to operate in accordance with a 5G NR network protocol such as that defined by the 3GPP.

During operation of the wireless communications system 400, the UE 115 may establish the PDCP entity 422. For example, to configure the PDCP entity 422, the UE 115 may establish the PDCP entity 422 to join an ongoing communication session, such as a unicast communication session, a multicast communication session, or a broadcast communication. In some implementations, the communication session includes a multicast data session. In such implementations, the U 115 may configure a multicast bearer (MRB) that includes or corresponds to a user plane stack having one or more layers, such as a SDAP layer, a PDCP layer, an RLC layer, a MAC layer, a PHY layer, or a combination thereof. Additionally, or alternatively, to establish the PDCP entity 422, the UE 115 may set the state variable 406 to the initial value 408. The state variable 406 may be associated with a communication window, such as a Tx window, an Rx window, or a combination thereof, of a communication session. For example, the state variable may include a window size of the communication window, a lower edge value for the communication window, an upper edge value for the communication window, at least one of the first through fourth state variables, or a combination thereof. The initial value 408 may be based on a standard, equal to zero, or a combination thereof. Additionally, or alternatively, the initial values 408 may be included in or indicated by an RRC message that is transmitted by the base station 105 and received by the UE 115. In some implementations, the UE 115 may initiate establishment of the communication session after configuring the PDCP entity 422.

In some implementations, the base station 105 may also establish a PDCP entity that is associated with the communication session. In some implementations, a transmit PDCP entity of the base station 105 may be synchronized with the PDCP entity 422, such as a receive RLC entity, of the UE 115. Additionally, or alternatively, a receive PDCP entity of the base station 105 may be synchronized with the PDCP entity 422, such as a transmit PDCP entity, of the UE 115. Synchronization of a PDCP entity of the base station 105 and the PDCP entity 422 of the UE 115 may include synchronization of an PDCP sliding window movement in time such the a PDCP sliding window of the base station 105 and a PDCP sliding window of the UE 115 entirely or at least partially overlap in time.

After configuration of the PDCP entity 422, the base station 105 may generate a control message 470, such as a PDCP control message. In some implementations, generation or transmission of the control message 470 may be part of establishment of the communication session. Additionally, or alternatively, the control message 470 may be included in an RRC message. To illustrate, the base station 105 may generate the RRC message that includes the control message 370, the control message 470, or a combination thereof. The control message 470 may include an indication of a first value 471 of the state variable 455 maintained by the base station 105 and associated with a communication window of the communication session. The first value 471 may enable synchronization of the communication window of the communication window of the UE 115 and may be different than the initial value 408, a value of the state variable 406, or both. After generation of the control message 470, the base station 105 transmits the control message 470 to the UE 115. In some implementations, the control message 470, such as the first value 471, may include or indicate the initial value 408.

In some implementations, the control message 470 includes a first PDCP PDU sent to the UE 115 after establishment of the PDCP entity 422. For example, the control message 470 may include a synchronization PDU that includes the first value 471. Additionally, or alternatively, the control message 470 may include an RRC that includes the first value 471. In some implementations, the first value 471 includes the second state variable (Rx_Next), the third state variable (Rx_DELIV), a value associated with a lower edge of a communication window, a value associated with an upper edge of the communication window, or a combination thereof.

In some implementations, the UE 115 may establish the communication session such that the UE 115 joins an ongoing multicast session in which the base station 105 includes a PDCP entity having a current value of the state variable 455. When the UE 115 joins the ongoing multicast session UE establishes with the state variable 406 set to the initial value 408, a mis-match may occur between the 115 UE variable 406 and the base station state variable 455, such that a communication window of the UE 115 and a communication window of the base station 105 are out of synchronization. When a mis-match is presents such that the communication windows are out of synchronization, the UE 115 may miss data transmitted by the base station 105.

The UE 115 receives the control message 470 including the indication of the first value 471. The UE 115 may set the state variable 406 based on control message 470. For example, the UE 115 may set the state variable 406 from the initial value 408, or a current value, to the first value 471. Setting the state variable 406 to the first value 471 may synchronize the communication window (associated with the PDCP entity 422) of the UE 115 with the base station 105. After setting the state variable 406, the UE 115 may receive or transmit data, such as PDCP data, associated with the communication session within the communication window based on the state variable 406. To illustrate, the UE 115 may receive a PDCP data PDU associated with the communication session from the base station 105.

In some implementations, the UE 115 may perform a handover operation from the base station 360 to the base station 115. For example, the UE 115 may send a handover request 478 to the base station 360 to initiate the handover operation from a first cell associated with the base station 360 to a second cell, such as a target cell, associated with the base station 105. To illustrate, the UE 115 may have established the PDCP entity 422 and joined the communication session the base station 360 and may perform the handover operation to continue the communication session via the base station 105.

After the handover operation, the UE 115 may re-establishing the PDCP entity 422 based on completion of the handover operation to the target cell, such as the base station 105. The UE 115 may receive the control message 470, such as a PDCP control message, after the PDCP entity 422 is re-established. For example, the UE 115 may receive initial state variables, such as initial state variables 408, in an RRC message. In some implementations, the control message 470 transmitted by the base station 105 after completion of the handover operation may include a PDCP data PDU. In some implementations, after the PDCP entity 422 is re-established, the UE 115 may receive a message that includes a SN and may determine or generate state variables based on the received SN.

Based on the control message 470 received after completion of the handover operation, the UE 115 may set the state variable 406 based on the received control message 470. After setting the state variable 406, the UE 115 may receive or transmit a data, such as PDCP data, associated with the communication session within the communication window based on the state variable 406.

In some implementations, the base station 105 may determine whether the UE 115 joined the communication session or completed a handover operation. The base station 105 may generate and transmit the control message 470 the UE 115 based on a determine that the UE joined the communication session or completed a handover operation.

In some implementations, the base station 105 may generate one or more synchronization (sync) messages, such as one or more synchronization PDUs, during the communication session. For example, the one or more synchronization messages may include a representative synchronization message 474. Each of the one or each of the one or more synchronization message may include a respective indication of a corresponding update of the state variable 406 of the UE 115. To illustrate, the synchronization message 374 may include a second value 475 of the state variable 45 maintained by the base station 105 and associated with a communication window of the communication session. In some implementations, the second value 475 includes the second state variable (Rx_Next), the third state variable (Rx_DELIV), a value associated with a lower edge of a communication window, a value associated with an upper edge of the communication window, or a combination thereof. The second value 475 may enable synchronization of the communication window of the communication window of the UE 115 and may be different than a value of the state variable 406. For example, the UE 115 may experience fading conditions and the synchronization message 474 including the second value 475 may enable the UE 115 to quickly adjust state variable 406 and come back in synchronization with the ongoing communication session, such as a multicast service.

After generation of a synchronization message, such as the synchronization message 474, the base station 105 may transmit the synchronization message to the UE 115. The UE 115 may receive the synchronization message and determine whether or not to update the state variable 406 based on indication of the corresponding update of the state variable 406. For example, the UE 115 may determine to update the state variable 406 and may update the state variable based on the received synchronization message, such as based on the received second value 475. In some implementations, the sync message 474 may be a control PDU included in or coupled to, such as piggyback to, a data PDU.

In some implementations, the base station 105 periodically transmits a synchronization message to the UE 115 to enable the UE 115 to maintain synchronization of the communication window (of the UE 115) with the base station 105. Additionally, or alternatively, the base station 105 may generate or transmit the sync message 474 based on determination of an event. The event may include or correspond to an indication that the UE 115 is gone through some fading and returned to good radio conditions, such as having a physical layer that has gone from out-of-sync to in-sync, resulting in one or more lost packets and communication windows of the UE 115 and the base station 105 being unsynchronized. As another example, the event may include or correspond to the base station 105 determining that retransmissions are exhausted for an edge of the packets, such that the lower edge of the UE 115 needs to be moved to avoid additional retransmissions. As another example, determination of the event may be based on a load balancing or retransmission policy. As a further example, if the UE 115 is configured for RLC UM, the event may be determined based on packet loss at the PDCP level, which may occur even in good radio conditions if the PDCP window of the UE 115 is mis-aligned with the PDCP window of the base station 105. Another example of the event may be PDCP activation from a suspension of PDCP operations.

Although synchronization of the command window has been described and being maintained based on the control message 470 and the synchronization message 474, either of the control message 470 or synchronization message 474 may be utilized without the other. Additionally, although the control message 470 has been described as being provided based on the UE 115 joining the communications session and completing a handover operation, in other implementations, the control message 470 may be provided for one of joining the communications session and completing the handover operation, but not the other.

In some implementations, the control message 470 or the sync message 474 may include a control PDU type (CPT) filed that includes one or more bits. The one or more bits may indicate the type of control information included in the control message 470, such as a PDCP control PDU. In some implementations, the one or more bits may have a first value, such as 000, which indicates the type of control information included in the control message 470 or the sync message 474 is a PDCP status report. As another example, the one or more bits may have a second value, such as a 001, which indicates the type of control information included in the control message 470 or the sync message 474 is interspersed robust header compression (ROHC) feedback. As another example, the one or more bits may have a third value, such as 010, which indicates the type of control information included in the control message 470 or the sync message 474 is a synchronization PDU, such as a PDCP MRB synchronization PDU.

As described with reference to FIG. 4, the present disclosure provides techniques for management of state variable 406. In some aspects, the present disclosure provides management of the state variable 406 by providing the control message 470 that includes the first value 471. For example, the control message 470 may be provided based on establishment or re-establishment of the PDCP entity 422 at the UE 115. Additionally, or alternatively, the present disclosure provides management of the state variable 406 by providing the synchronization message 474 that includes the second value 475. Each of the control message 470 and the synchronization message 474 enable the UE 115 to maintain synchronization with the base station 115. By maintaining synchronization between the UE 115 and the base station 105, the UE 115 may experience fewer interruptions during the communication session and thereby provide a positive user experience.

FIG. 5 is a flow diagram illustrating an example process 500 that supports management of a state variable according to one or more aspects. Operations of the process 500 may be performed by a UE, such as the UE 115 described above with reference to FIGS. 1-4 or a UE as described with reference to FIG. 6. For example, example operations (also referred to as "blocks") of the process 500 may enable the UE 115 to manage a state variable.

In block 502, the UE initializes a set of state variables to a first set of initial values, respectively. The set of state variables are associated with synchronization of a communication window of a communication session. For example, the set of state variables may include or correspond to the state variable 306 or 406. The first set of initial values may include or correspond to the initial value 308 or 408. The communication session may include a unicast communication session, a multicast communication session, or a broadcast communication. For example, the communication session may be the multicast communication session.

In some implementations, the communication window may include a Tx window, an Rx window, or a combination thereof. Additionally, or alternatively, the set of state variables include a window size of the communication window, a lower edge value for the communication window, an upper edge value for the communication window, or a combination thereof. In some implementations, the set of state variables include a window size of the communication window, and a lower edge value for the communication window or an upper edge value for the communication window.

In block 504, the UE receives a control message including an indication of a second set of current values associated with respective state variables of the set of state variables. At least one of the current values being different than a respective one of the initial values. For example, the control message and the indication may include or correspond to the control message 370 and the first value 371, respectively, or the control message 470 and the first value 471, respectively. In some implementations, the indication of the second set of current values may be generated by a base station, such as the base station 105, based on one or more state variables maintained by the base station.

In block 506, the UE sets the set of state variables to the second set of current values to synchronize the communication window with the communication session. In some implementations, setting the set of state variables based on the indication includes adjusting the set of state variables from the first set of initial values to the second set of current values, or to a third set of value base on the second set of current values.

In some implementations, the UE, after setting the set of state variables, receives or transmits a packet associated with the communication session within the communication window based on the synchronized communication window. For example, the packet may include or correspond to the packet 372.

In some implementations, the set of state variables corresponds to an RLC AM entity. The UE may configure the RLC AM entity, which may include setting the set of state variables to the set of respective initial values. The set of respective initial values may be based on a standard. In some implementations, at least one value of the set of respective initial values is zero. Additionally, or alternatively, the UE may join an ongoing multicast data session corresponding to the communication session.

In some implementations, the control message includes an RLC control message. The RLC control message may be included in an RLC PDU received next in time after completion of configuring the RLC AM entity. Additionally, the UE may initiate establishment of the communication session after configuring the RLC AM entity.

In some implementations, after configuring the RLC AM entity, the UE may perform a handover operation to a target cell. For example, the UE may perform a handover operation from a first cell to a second cell, such as the target cell. The UE may re-establish the RLC AM entity based on completion of the handover operation to the target cell. In some such implementations, the RLC control message is received after the RLC AM entity is re-established.

In some implementations, the control message includes a synchronization PDU that includes the indication. The UE may update the set of state variables, in response to receiving one synchronization PDU of the one or more synchronization PDUs, based on the respective indication included in the received one synchronization PDU. In some implementations, the control message may be included in a data PDU that includes an assigned RLC SN. The RLC SN may include or correspond to the sequence number 377.

In some implementations, after setting the set of state variables based on the indication and during the communication session, the UE may receive one or more synchronization PDUs. The one or more synchronization PDUs may include or correspond to the synchronization message 374 or 474. In some implementations, each of the one or more received synchronization PDUs include a respective indication of a corresponding update of the one or more state variables. For example, the indication may include or correspond to the second value 375 or 475. The UE may update the set of state variables based on the indication included in a particular synchronization PDU of the one of the one or more synchronization PDUs. In some implementations, the one or more synchronization PDUs include multiple synchronization PDUs transmitted periodically.

FIG. 6 is a block diagram of an example UE 600 that supports management of a state variable according to one or more aspects. The UE 600 may be configured to perform operations, including the blocks of the process 500 described with reference to FIG. 5. In some implementations, the UE 600 includes the structure, hardware, and components shown and described with reference to the UE 115 of FIG. 2, 3, or 4. For example, the UE 600 includes the controller 280, which operates to execute logic or computer instructions stored in the memory 282, as well as controlling the components of the UE 600 that provide the features and functionality of the UE 600. The UE 600, under control of the controller 280, transmits and receives signals via wireless radios 601a-r and the antennas 252a-r. The wireless radios 601a-r include various components and hardware, as illustrated in FIG. 2 for the UE 115, including the modulator and demodulators 254a-r, the MIMO detector 256, the receive processor 258, the transmit processor 264, and the TX MIMO processor 266.

As shown, the memory 282 may include state variable logic 602 and entity logic 603. The state variable logic 602 may be configured to set, adjust, update, or synchronize one or more state variables, such as state variable 306 or 406. The entity logic 603 may be configured to receive or process one or more received messages, such as the control message 370 or 470, the packet 372, the synchronization message 374 or 474, or a combination thereof. The UE 600 may receive signals from or transmit signals to one or more network entities, such as the base station 105 of FIGS. 1-4, the base station 360 of FIG. 3 or, or a base station as illustrated in FIG. 8.

In some implementations, the UE 600 may be configured to perform the process 500 of FIG. 5. To illustrate, the UE 600 may execute, under control of the controller 280, the state variable logic 602 and the entity logic 603 stored in the memory 282. The execution environment of the state variable logic 602 provides the functionality to perform at least the operations in block 502, in block 506, or a combination thereof. The execution environment of the entity logic 603 provides the functionality to perform at least the operations in block 504.

Figures 7, 8:
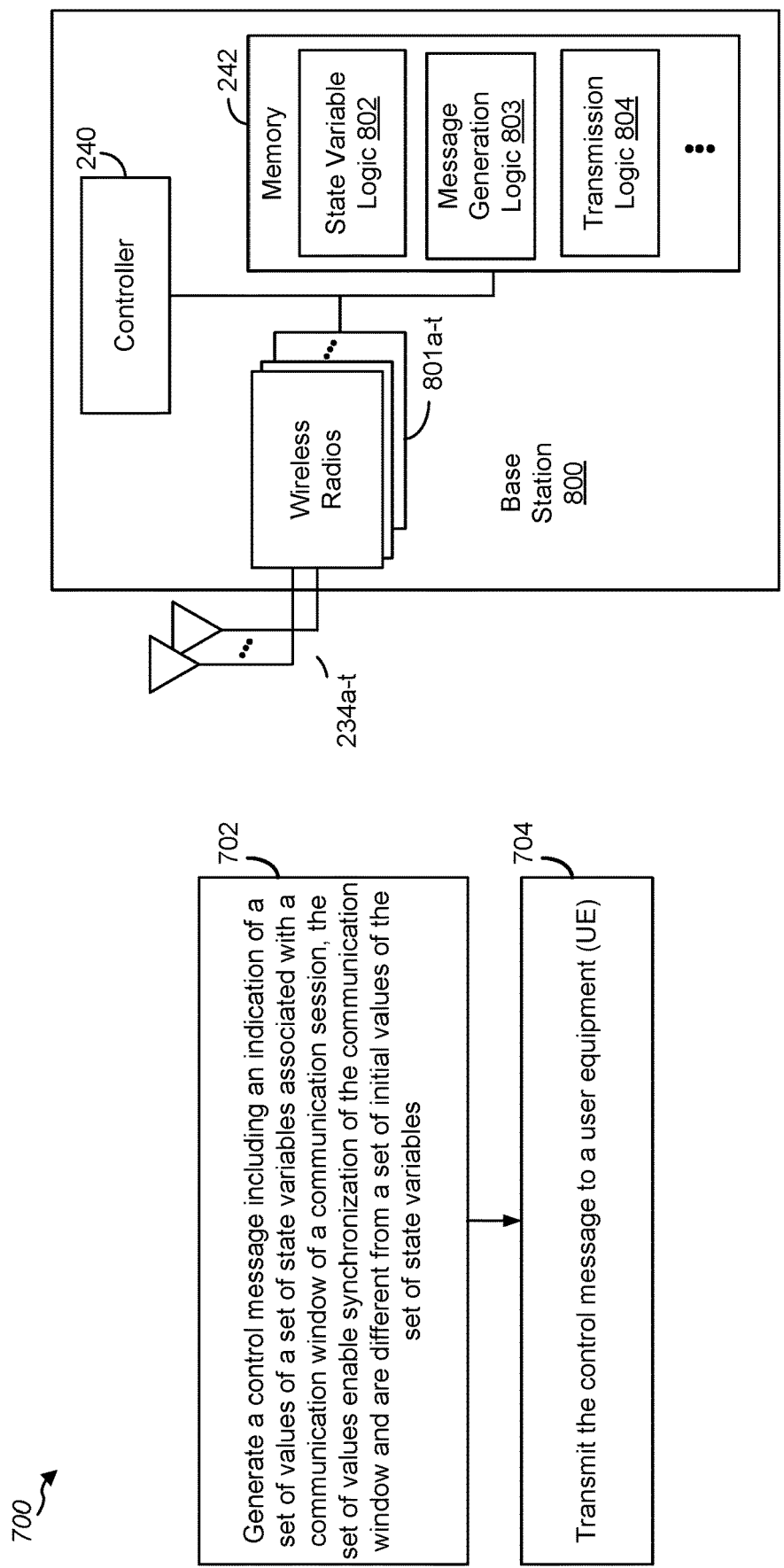
FIG. 7 is a flow diagram illustrating an example process that supports management of a state variable according to one or more aspects.
FIG. 8 is a block diagram of an example base station that supports management of a state variable according to one or more aspects.

FIG. 7 is a flow diagram illustrating an example process 700 that supports management of a state variable according to one or more aspects. Operations of the process 700 may be performed by a base station, such as the base station 105 described above with reference to FIGS. 1-4, the base station 360 as described above with reference to FIG. 3 or 4, or a base station as described with reference to FIG. 8. For example, example operations of the process 700 may enable the base station to manage a state variable.

In block 702, the base station generating a control message including an indication of a set of values of a set of state variables associated with a communication window of a communication session. The set of values enable synchronization of the communication window and are different from a set of initial values of the set of state variables. For example, the control message may include or correspond to the control message 371. The set of value may include or correspond to the first value 371. The set of initial values may include or correspond to the initial value 308 or 408.

In some implementations, the control messages is associated with an RLC entity of the UE. For example, the entity may include or correspond to RLC entity 320 or PDCP 422. In some implementations, the entity may include an RLC AM entity.

In block 704, the base station transmitting the control message to a UE. For example, the UE may include or correspond to the UE 115. In some implementations, after transmitting the control message, the base station may transmit or receive a packet associated with the communication session. For example, the packet may include or correspond to the packet 372.

In some implementations, the communication session includes a unicast communication session, a multicast communication session, or a broadcast communication. For example, the communication session may be the multicast communication session. Additionally, or alternatively, the communication window includes a Tx window, an Rx window, or a combination thereof. Additionally, the one or more state variables may include a window size of the communication window, a lower edge value for the communication window, an upper edge value for the communication window, or a combination thereof.

In some implementations, the base station may determine whether the UE joined the communication session or completed a handover operation. Additionally, or alternatively, the base station may transmit the control message to the UE based on a determine that the UE joined the communication session or completed a handover operation. In some implementations, the control message may be transmitted to the UE independent of a sequence number associated with the communication session.

In some implementations, the base station may generate one or more synchronization PDUs. At least one of the one or more synchronization PDUs may include or correspond to the synchronization message 374 or 474. In some implementations, each of the one or more synchronization PDUs include a respective indication of a corresponding update of the one or more state variables. The indication of the corresponding of the set of state variables may include or correspond to the second value 375 or 475. The base station may transmit the one or more synchronization PDUs. In some implementations, the one or more synchronization PDUs may include multiple synchronization PDUs transmitted periodically. Additionally, or alternatively, each synchronization PDU of the one or more synchronization PDUs may be included in a respective RLC data PDU that includes an RLC SN assigned based on the communication session. The RLC SN may include or correspond to the sequence number 377.

FIG. 8 is a block diagram of an example base station 800 that supports management of a state variable according to one or more aspects. The base station 800 may be configured to perform operations, including the blocks of the process 700 described with reference to FIG. 7. In some implementations, the base station 800 includes the structure, hardware, and components shown and described with reference to the base station 105 of FIGS. 1-4 or the base station 360 of FIG. 3 or 4. For example, the base station 800 may include the controller 240, which operates to execute logic or computer instructions stored in the memory 242, as well as controlling the components of the base station 800 that provide the features and functionality of the base station 800. The base station 800, under control of the controller 240, transmits and receives signals via wireless radios 801a-t and the antennas 234a-t. The wireless radios 801a-t include various components and hardware, as illustrated in FIG. 2 for the base station 105, including the modulator and demodulators 232a-t, the transmit processor 220, the TX MIMO processor 230, the MIMO detector 236, and the receive processor 238.

As shown, the memory 242 may include state variable logic 802, message generation logic 803, and transmission logic 804. The state variable logic 802 may be configured to set, adjust, and update one or more state variables, such as state variable 355 or 455. The message generation logic 803 may be configured to generate one or more messages, such as the control message 370 or 470, the packet 372, the synchronization message 374 or 474, or a combination thereof. The transmission logic 804 may be configured to transmit one or more messages generated by the message generation logic 803. The base station 800 may receive signals from or transmit signals to one or more UEs, such as the UE 115 of FIGS. 1-4 or the UE 700 of FIG. 7.

In some implementations, the base station 800 may be configured to perform the process 700 of FIG. 7. To illustrate, the base station 800 may execute, under control of the controller 240, the state variable logic 802, the message generation logic 803, or the transmission logic 804 stored in the memory 242. The execution environment of the state variable logic 802 provides the functionality to perform at least the operations associated with block 702. The execution environment of the message generation logic 803 provides the functionality to perform at least the operations in block 702. The execution environment of the transmission logic 804 provides the functionality to perform at least the operations in block 704.

It is noted that one or more blocks (or operations) described with reference to FIG. 5 or 7 may be combined with one or more blocks (or operations) described with reference to another of the figures. For example, one or more blocks (or operations) of FIG. 5 may be combined with one or more blocks (or operations) of FIG. 7. As another example, one or more blocks associated with FIG. 4 or 7 may be combined with one or more blocks (or operations) associated with FIG. 1, 2, 3, or 4. Additionally, or alternatively, one or more operations described above with reference to FIG. 1, 2, 3, or 4 may be combined with one or more operations described with reference to FIG. 6 or 8.

In some aspects, techniques for enabling management of a state variable may include additional aspects, such as any single aspect or any combination of aspects described below or in connection with one or more other processes or devices described elsewhere herein. In a first aspect, techniques for enabling management of a state variable a may include initializing one or more state variables associated with an RLC entity to a set of one or more respective initial values, the one or more state variables associated with a communication window of a communication session; receiving an RLC control message including an indication of a set of one or more values associated with the one or more state variables, at least one value of the set of one or more values is different than at least one respective value of the set of one or more initial values; and synchronizing the communication window with the communication session based on setting the one or more state variables to the set of one or more values. In some examples, the techniques in the first aspect may be implemented in a method or process. In some other examples, the techniques of the first aspect may be implemented in a wireless communication device such as a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In a second aspect, in combination with the first aspect, the techniques further include receiving or transmitting a packet associated with the communication session within the communication window based on the synchronizing.

In a third aspect, in combination with the first aspect or the second aspect, the RLC entity includes an RLC AM entity.

In a fourth aspect, in combination with one or more of the first aspect through the third aspect, the communication session includes a unicast communication session, a multicast communication session, or a broadcast communication.

In a fifth aspect, in combination with the fourth aspect, the communication session includes the multicast communication session.

In a sixth aspect, in combination with one or more of the first aspect through the fifth aspect, the techniques further include configuring the RLC entity, where configuring the RLC entity includes setting the one or more state variables to the set of one or more respective initial values.

In a seventh aspect, in combination with the sixth aspect, the set of one or more respective initial values is based on a standard.

In an eighth aspect, in combination with the sixth aspect or the seventh aspect, at least one value of the set of one or more respective initial values is zero.

In a ninth aspect, in combination with one or more of the sixth aspect through the eighth aspect, the techniques further include initiating establishment of the communication session after completion of configuring the RLC entity.

In a tenth aspect, in combination with one or more of the sixth aspect through the ninth aspect, the techniques further include joining an ongoing multicast data session corresponding to the communication session.

In an eleventh aspect, in combination with one or more of the sixth aspect through the tenth aspect, the RLC control message is included in an RLC PDU received next in time after completion of configuring the RLC entity.

In a twelfth aspect, in combination with one or more of the first aspect through the fifth aspect, the techniques further include configuring the RLC entity, after configuring the RLC entity, performing a handover operation to a target cell, and re-establishing the RLC entity based on completion of the handover operation to the target cell, the RLC control message being received after the RLC entity is re-established.

In a thirteenth aspect, in combination with the twelfth aspect, the RLC control message includes a synchronization PDU that includes the indication.

In a fourteenth aspect, in combination with the twelfth aspect or the thirteenth aspect, the RLC control message is included in an RLC PDU that includes an assigned RLC SN.

In a fifteenth aspect, in combination with one or more of the first aspect through the fourteenth aspect, setting the one or more state variables based on the indication includes adjusting the one or more state variables from the set of one or more respective initial values to a first set of one or more respective values based on the indication.

In a sixteenth aspect, in combination with one or more of the first aspect through the fifteenth aspect, the communication window includes a Tx window, an Rx window, or a combination thereof.

In a seventeenth aspect, in combination with one or more of the first aspect through the sixteenth aspect, the one or more state variables include a window size of the communication window, a lower edge value for the communication window, an upper edge value for the communication window, or a combination thereof.

In an eighteenth aspect, in combination with one or more of the first aspect through the seventeenth aspect, the one or more state variables include a window size and a lower edge value or an upper edge value.

In a nineteenth aspect, in combination with one or more of the first aspect or the eighteenth aspect, the techniques further include setting the one or more state variables based on the indication, and, after the setting and during the communication session, receiving one or more synchronization PDUs, each of the one or more received synchronization PDUs including a respective indication of a corresponding update of the one or more state variables.

In a twentieth aspect, in combination with the nineteenth aspect, the techniques further include updating, in response to receiving one synchronization PDU of the one or more synchronization PDUs, the one or more state variables based on the respective indication included in the received one synchronization PDU.

In a twenty-first aspect, in combination with the nineteenth aspect through the twentieth aspect, the one or more synchronization PDUs include multiple synchronization PDUs transmitted periodically.

In some aspects, techniques for enabling management of a state variable may include additional aspects, such as any single aspect or any combination of aspects described below or in connection with one or more other processes or devices described elsewhere herein. In a twenty-second aspect, techniques for enabling management of a state variable a may include generating an RLC control message including an indication of a set of one or more values of one or more respective state variables associated with a communication window of a communication session, the set of one or more values of the one or more state variables enable synchronization of the communication window and are different from a set of one or more initial values of the one or more respective state variables; and transmitting the RLC control message to a UE. In some examples, the techniques in the first aspect may be implemented in a method or process. In some other examples, the techniques of the first aspect may be implemented in a wireless communication device such as a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In a twenty-third aspect, in combination with the twenty-second aspect, the RLC control messages is associated with an RLC entity of the UE.

In a twenty-fourth aspect, in combination with the twenty-second aspect or the twenty-third aspect, the RLC entity includes an RLC AM entity.

In a twenty-sixth aspect, in combination with one or more of the twenty-second aspect through the twenty-fifth aspect, the communication session includes a unicast communication session, a multicast communication session, or a broadcast communication.

In a twenty-seventh aspect, in combination with one or more of the twenty-second aspect through the twenty-sixth aspect, the communication window includes a Tx window, an Rx window, or a combination thereof.

In a twenty-eighth aspect, in combination with one or more of the twenty-second aspect through the twenty-seventh aspect, the one or more state variables include a window size of the communication window, a lower edge value for the communication window, an upper edge value for the communication window, or a combination thereof.

In a twenty-ninth aspect, in combination with one or more of the twenty-second aspect through the twenty-seventh aspect, the techniques further include, after transmitting the RLC control message, transmitting or receiving a packet associated with the communication session.

In a thirtieth aspect, in combination with one or more of the twenty-second aspect through the twenty-seventh aspect, the techniques further include determining whether the UE joined the communication session or completed a handover operation, wherein the RLC control message is transmitted to the UE based on a determine that the UE joined the communication session or completed the handover operation.

In a thirty-first aspect, in combination with the thirtieth aspect, the RLC control message is transmitted to the UE independent of an RLC SN associated with the communication session.

In a thirty-second aspect, in combination with one or more of the twenty-second aspect through the twenty-seventh aspect, the techniques further include generating one or more synchronization PDUs, each of the one or more synchronization PDUs including a respective indication of a corresponding update of the one or more state variables, and transmitting the one or more synchronization PDUs.

In a thirty-third aspect, in combination with the thirty-second aspect, the one or more synchronization PDUs include multiple synchronization PDUs transmitted periodically.

In a thirty-fourth aspect, in combination with the thirty-second aspect or the thirty-third aspect, each synchronization PDU of the one or more synchronization PDUs is included in a respective RLC data PDU that includes an RLC SN assigned based on the communication session.

In some aspects, techniques for enabling management of a state variable may include additional aspects, such as any single aspect or any combination of aspects described below or in connection with one or more other processes or devices described elsewhere herein. In a thirty-fifth aspect, techniques for enabling management of a state variable may include initializing one or more state variables to a set of one or more respective initial values, the one or more state variables associated with a communication window of a communication session; receiving a control message including an indication of a set of one or more values associated with the one or more state variables, at least one value of the set of one or more values being different than at least one respective value of the set of one or more initial values; synchronizing the communication window with the communication session based on setting the one or more state variables to the set of one or more values; and receiving or transmitting a packet associated with the communication session within the communication window based on the synchronizing. In some examples, the techniques in the thirty-fifth aspect may be implemented in a method or process. In some other examples, the techniques of the thirty-fifth aspect may be implemented in a wireless communication device such as a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In a thirty-sixth aspect, in combination with the thirty-fifth aspect, the communication session includes a unicast communication session, a multicast communication session, or a broadcast communication.

In a thirty-seventh aspect, in combination with the thirty-sixth aspect, the communication session includes the multicast communication session.

In a thirty-eighth aspect, in combination with one or more of the thirty-fifth aspect through the thirty-seventh aspect, the one or more state variables are associated with an RLC entity and the control message includes an RLC control message.

In a thirty-ninth aspect, in combination with the thirty-eighth aspect, the RLC entity includes an RLC AM entity or an RLC UM entity.

In a fortieth aspect, in combination with the thirty-eighth aspect or the thirty-ninth aspect, the techniques further include configuring the RLC entity, wherein configuring the RLC entity includes setting the one or more state variables to the set of one or more respective initial values.

In a forty-first aspect, in combination with the fortieth aspect, the set of one or more respective initial values is based on a standard.

In a forty-second aspect, in combination with the fortieth aspect or the forty-first aspect, at least one value of the set of one or more respective initial values is zero.

In a forty-third aspect, in combination with one or more of the fortieth aspect through the forty-second aspect, the techniques further include initiating establishment of the communication session after completion of configuring the RLC entity.

In a forty-fourth aspect, in combination with one or more of the fortieth aspect through the forty-third aspect, the techniques further include joining an ongoing multicast data session corresponding to the communication session.

In a forty-fifth aspect, in combination with one or more of the fortieth aspect through the forty-fourth aspect, the RLC control message is included in an RLC protocol data unit (PDU) received next in time after completion of configuring the RLC entity.

In a forty-sixth aspect, in combination with the thirty-eighth aspect or the thirty-ninth aspect, the techniques further include configuring the RLC entity.

In a forty-seventh aspect, in combination with the forty-sixth aspect, the techniques further include, after configuring the RLC entity, performing a handover operation to a target cell.

In a forty-eighth aspect, in combination with the forty-seventh aspect, the techniques further include re-establishing the RLC entity based on completion of the handover operation to the target cell, the RLC control message being received after the RLC entity is re-established.

In a forty-ninth aspect, in combination with the forty-eighth aspect, the RLC control message includes a synchronization PDU that includes the indication.

In a fiftieth aspect, in combination with the forty-eighth aspect or the forty-ninth aspect, the RLC control message is included in an RLC data PDU that includes an assigned RLC SN.

In a fifty-first aspect, in combination with one or more of the thirty-fifth aspect through the thirty-seventh aspect, the one or more state variables are associated with a PDCP entity and the control message includes a PDCP control message.

In a fifty-second aspect, in combination with one or more of the thirty-fifth aspect through the thirty-seventh aspect, the techniques further include receiving an RRC message that indicates the set of one or more initial values.

In a fifty-third aspect, in combination with the fifty-first aspect or the fifty-second aspect, the techniques further include configuring the PDCP entity, wherein configuring the PDCP entity includes setting the one or more state variables to the set of one or more respective initial values.

In a fifty-fourth aspect, in combination with the fifty-third aspect, the set of one or more respective initial values is based on a standard.

In a fifty-fifth aspect, in combination with the fifty-third aspect or the fifty-fourth aspect, at least one value of the set of one or more respective initial values is zero.

In a fifty-sixth aspect, in combination with one or more of the fifty-third aspect through the fifty-fifth aspect, the techniques further include initiating establishment of the communication session after completion of configuring the PDCP entity.

In a fifty-seventh aspect, in combination with one or more of the fifty-third aspect through the fifty-sixth aspect, the techniques further include joining an ongoing multicast data session corresponding to the communication session.

In a fifty-eighth aspect, in combination with one or more of the fifty-third aspect through the fifty-seventh aspect, the PDCP control message is included in a PDCP PDU received next in time after completion of configuring the PDCP entity.

In a fifty-ninth aspect, in combination with the fifty-first aspect, the techniques further include configuring the PDCP entity.

In a sixtieth aspect, in combination with the fifty-ninth aspect, the techniques further include, after configuring the PDCP entity, performing a handover operation to a target cell.

In a sixty-first aspect, in combination with the sixtieth aspect, the techniques further include re-establishing the PDCP entity based on completion of the handover operation to the target cell, the PDCP control message being received after the PDCP entity is re-established.

In a sixty-second aspect, in combination with the forty-ninth aspect, the PDCP control message includes a synchronization PDU that includes the indication.

In a sixty-third aspect, in combination with one or more of the thirty-fifth aspect through the sixty-second aspect, setting the one or more state variables based on the indication includes adjusting the one or more state variables from the set of one or more respective initial values to a first set of one or more respective values based on the indication.

In a sixty-fourth aspect, in combination with one or more of the thirty-fifth aspect through the sixty-third aspect, the communication window includes a Tx window, an Rx window, or a combination thereof.

In a sixty-fifth aspect, in combination with one or more of the thirty-fifth aspect through the sixty-fourth aspect, the one or more state variables include a window size of the communication window, a lower edge value for the communication window, an upper edge value for the communication window, or a combination thereof.

In a sixty-sixth aspect, in combination with one or more of the thirty-fifth aspect through the sixty-fifth aspect, the one or more state variables include a window size and a lower edge value or an upper edge value.

In a sixty-seventh aspect, in combination with one or more of the thirty-fifth aspect through the sixty-sixth aspect, the techniques further include setting the one or more state variables based on the indication.

In a sixty-eighth aspect, in combination with the sixty-seventh aspect, the techniques further include, after the setting and during the communication session, receiving one or more synchronization PDUs, each of the one or more received synchronization PDUs including a respective indication of a corresponding update of the one or more state variables.

In a sixty-ninth aspect, in combination with the sixty-eighth aspect, the techniques further include updating, in response to receiving one synchronization PDU of the one or more synchronization PDUs, the one or more state variables based on the respective indication included in the received one synchronization PDU.

In a seventieth aspect, in combination with the sixty-sixth aspect or the sixty eighth aspect, the one or more synchronization PDUs include multiple synchronization PDUs transmitted periodically.

In some aspects, techniques for enabling management of a state variable may include additional aspects, such as any single aspect or any combination of aspects described below or in connection with one or more other processes or devices described elsewhere herein. In a seventy-first aspect, techniques for enabling management of a state variable a may include generating a control message including an indication of a set of one or more values of one or more respective state variables associated with a communication window of a communication session, the set of one or more values of the one or more state variables enable synchronization of the communication window and are different from a set of one or more initial values of the one or more respective state variables; and transmitting the control message to a UE. In some examples, the techniques in the seventy-first aspect may be implemented in a method or process. In some other examples, the techniques of the seventy-first aspect may be implemented in a wireless communication device such as a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In a seventy-second aspect, in combination with the seventy-first aspect, the control message includes an RLC control messages is associated with an RLC entity of the UE.

In a seventy-third aspect, in combination with the seventy-second aspect, the RLC entity includes an RLC AM entity or an RLC UM entity.

In a seventy-fourth aspect, in combination with the seventy-second or the seventy-third aspect, the techniques further include, after transmitting the RLC control message, transmitting or receiving a packet associated with the communication session.

In a seventy-fifth aspect, in combination with one or more of the seventy-second aspect through the seventy-fourth aspect, the techniques further include determining whether the UE joined the communication session or completed a handover operation, wherein the RLC control message is transmitted to the UE based on a determination that the UE joined the communication session or completed the handover operation.

In a seventy-sixth aspect, in combination with the seventy-fifth aspect, the RLC control message is transmitted to the UE independent of an RLC SN associated with the communication session.

In a seventy-seventh aspect, in combination with one or more of the seventy-first aspect through the seventy-sixth aspect, the techniques further include generating one or more synchronization PDUs, each of the one or more synchronization PDUs including a respective indication of a corresponding update of the one or more state variables.

In a seventy-eighth aspect, in combination with the seventy-seventh aspect, the techniques further include initiating transmission of or transmitting the one or more synchronization PDUs.

In a seventy-ninth aspect, in combination with the seventy-eighth aspect, the one or more synchronization PDUs include multiple synchronization PDUs transmitted periodically.

In an eightieth aspect, in combination with the seventy-eighth aspect or the seventy-ninth, each synchronization PDU of the one or more synchronization PDUs is included in a respective RLC data PDU that includes an RLC SN assigned based on the communication session.

In an eighty-first aspect, in combination with the seventy-first aspect, the control message includes a PDCP control messages is associated with an RLC entity of the UE.

In an eighty-second aspect, in combination with the eighty-first aspect, the techniques further include determining whether the UE joined the communication session or completed a handover operation. In some implementations of the eighty-second aspect, the PDCP control message is transmitted to the UE based on a determination that the UE joined the communication session or completed the handover operation.

In an eighty-third aspect, in combination with the eighty-first aspect or the eighty-second aspect, the techniques further include generating one or more synchronization PDUs, each of the one or more synchronization PDUs including a respective indication of a corresponding update of the one or more state variables.

In an eighty-fourth aspect, in combination with the eighty-third aspect, the techniques further include initiating transmission of or transmitting the one or more synchronization PDUs.

In an eighty-fifth aspect, in combination with the eighty-fourth aspect, the one or more synchronization PDUs include multiple synchronization PDUs transmitted periodically or each synchronization PDU of the one or more synchronization PDUs is included in a respective PDCP data PDU In an eighty-sixth aspect, in combination with the eighty-fourth aspect, at least one synchronization PDU of the one or more synchronization PDUs is transmitted based on a determination that the UE transitioned from a physical layer being out-of-sync to a physical layer being in-sync, a determination that a number of packet retransmissions is greater than or equal to a threshold, a network load balancing or retransmission policy, or a determination that a PDCP level is lost.

In an eighty-seventh aspect, in combination with one or more of the seventy-first aspect through the eighty-sixth aspect, the communication session includes a unicast communication session, a multicast communication session, or a broadcast communication.

In an eighty-eighth aspect, in combination with one or more of the seventy-first aspect through the eighty-seventh aspect, the communication window includes a Tx window, an Rx window, or a combination thereof.

In an eighty-ninth aspect, in combination with one or more of the seventy-first aspect through the eighty-eighth aspect, the one or more state variables include a window size of the communication window, a lower edge value for the communication window, an upper edge value for the communication window, or a combination thereof.

In some aspects, techniques for enabling management of a state variable may include additional aspects, such as any single aspect or any combination of aspects described below or in connection with one or more other processes or devices described elsewhere herein. In a ninetieth aspect, techniques for enabling management of a state variable a may include initializing a set of state variables to a first set of initial values, respectively, the set of state variables being associated with synchronization of a communication window of a communication session; receiving a control message including an indication of a second set of current values associated with respective state variables of the set of state variables, at least one of the current values being different than a respective one of the initial values; setting the set of state variables to the second set of current values to synchronize the communication window with the communication session; and receiving or transmitting a packet associated with the communication session within the synchronized communication window. In some examples, the techniques in the ninetieth aspect may be implemented in a method or process. In some other examples, the techniques of the ninetieth aspect may be implemented in a wireless communication device such as a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In a ninety-first aspect, in combination with the ninetieth aspect, the communication session includes a unicast communication session, a multicast communication session, or a broadcast communication.

In a ninety-second aspect, in combination with the ninety-first aspect, the communication session includes the multicast communication session.

In a ninety-third aspect, in combination with the ninetieth aspect, the set of state variables is associated with an RLC entity that includes an RLC AM entity or an RLC UM entity.

In a ninety-fourth aspect, in combination with the ninety-third aspect, the techniques further include configuring the RLC entity, wherein configuring the RLC entity includes setting the set of state variables to the first set of respective initial values.

In a ninety-fifth aspect, in combination with the ninety-fourth aspect, the first set of respective initial values is based on a standard.

In a ninety-sixth aspect, in combination with the ninety-fourth aspect, at least one value of the first set of respective initial values is zero.

In a ninety-seventh aspect, in combination with the ninety-fourth aspect, the techniques further include initiating establishment of the communication session after completion of configuring the RLC entity.

In a ninety-eighth aspect, in combination with the ninety-fourth aspect, the techniques further include joining an ongoing multicast data session corresponding to the communication session.

In a ninety-ninth aspect, in combination with the ninety-fourth aspect, the RLC control message is included in an RLC PDU received next in time after completion of configuring the RLC entity.

In a one hundredth aspect, in combination with the ninety-third aspect, the techniques further include configuring the RLC entity.

In a one hundredth and first aspect, in combination with the one hundredth aspect, the techniques further include, after configuring the RLC entity, performing a handover operation to a target cell.

In a one hundredth and second aspect, in combination with the one hundredth and first aspect, the techniques further include re-establishing the RLC entity based on completion of the handover operation to the target cell, the RLC control message being received after the RLC entity is re-established.

In a one hundredth and third aspect, in combination with the one hundredth and second aspect, the RLC control message includes a synchronization PDU that includes the indication.

In a one hundredth and fourth aspect, in combination with the one hundredth and second aspect, the RLC control message is included in an RLC data PDU that includes an assigned RLC SN.

In a one hundredth and fifth aspect, in combination with the ninetieth aspect, 68. setting the set of state variables based on the indication includes adjusting the set of state variables from the first set of respective initial values to the second set of current values.

In a one hundredth and sixth aspect, in combination with the ninetieth aspect, the communication window includes a Tx window, an Rx window, or a combination thereof.

In a one hundredth and seventh aspect, in combination with the ninetieth aspect, the set of state variables include a window size of the communication window, a lower edge value for the communication window, an upper edge value for the communication window, or a combination thereof.

In a one hundredth and eighth aspect, in combination with the ninetieth aspect, the set of state variables include a window size and a lower edge value or an upper edge value.

In a one hundredth and ninth aspect, in combination with the ninetieth aspect, the techniques further include setting the set of state variables based on the indication.

In a one hundredth and tenth aspect, in combination with the one hundredth and ninth aspect, the techniques further include, after the setting and during the communication session, receiving one or more synchronization PDUs, each of the one or more received synchronization PDUs including a respective indication of a corresponding update of the set of state variables.

In a one hundredth and eleventh aspect, in combination with the ninetieth aspect, the techniques further include updating, in response to receiving one synchronization PDU of the one or more synchronization PDUs, the set of state variables based on the respective indication included in the received one synchronization PDU.

In a one hundredth and twelfth aspect, in combination with the ninetieth aspect, the one or more synchronization PDUs include multiple synchronization PDUs transmitted periodically.

In a one hundredth and thirteenth aspect, in combination with the ninetieth aspect, the set of state variables are associated with a PDCP entity and the control message includes a PDCP control message.

In a one hundredth and fourteenth aspect, in combination with the ninetieth aspect, the techniques further include receiving an RRC message that indicates the first set of initial values.

In a one hundredth and fifteenth aspect, in combination with the one hundredth and thirteenth aspect, the techniques further include configuring the PDCP entity, wherein configuring the PDCP entity includes setting the set of state variables to the first set of respective initial values.

In a one hundredth and sixteenth aspect, in combination with the one hundredth and fifteenth aspect, the first set of respective initial values is based on a standard.

In a one hundredth and seventeenth aspect, in combination with the one hundredth and fifteenth aspect, at least one value of the first set of respective initial values is zero.

In a one hundredth and eighteenth aspect, in combination with the one hundredth and fifteenth aspect, the techniques further include initiating establishment of the communication session after completion of configuring the PDCP entity.

In a one hundredth and nineteenth aspect, in combination with the one hundredth and fifteenth aspect, the techniques further include joining an ongoing multicast data session corresponding to the communication session.

In a one hundredth and twentieth aspect, in combination with the one hundredth and fifteenth aspect, the PDCP control message is included in a PDCP PDU received next in time after completion of configuring the PDCP entity.

In a one hundredth and twenty-first aspect, in combination with the ninetieth aspect, the techniques further include configuring the PDCP entity.

In a one hundredth and twenty-second aspect, in combination with the one hundredth and twenty-first aspect, the techniques further include, after configuring the PDCP entity, performing a handover operation to a target cell.

In a one hundredth and twenty-third aspect, in combination with the one hundredth and twenty-second aspect, the techniques further include re-establishing the PDCP entity based on completion of the handover operation to the target cell, the PDCP control message being received after the PDCP entity is re-established.

In a one hundredth and twenty-fourth aspect, in combination with the one hundredth and twenty-third aspect, the PDCP control message includes a synchronization PDU that includes the indication.

In some aspects, techniques for enabling management of a state variable may include additional aspects, such as any single aspect or any combination of aspects described below or in connection with one or more other processes or devices described elsewhere herein. In a one hundredth and twenty-fifth aspect, techniques for enabling management of a state variable a may include generating a control message including an indication of a set of values of a set of state variables associated with a communication window of a communication session, the set of values enable synchronization of the communication window and are different from a set of initial values of the set of state variables; and transmitting the control message to a UE. In some examples, the techniques in the one hundredth and twenty-fifth aspect may be implemented in a method or process. In some other examples, the techniques of the one hundredth and twenty-fifth aspect may be implemented in a wireless communication device such as a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In a one hundredth and twenty-sixth aspect, in combination with the one hundredth and twenty-fifth aspect, the control messages is associated with an RLC entity of the UE.

In a one hundredth and twenty-seventh aspect, in combination with the one hundredth and twenty-sixth aspect, the RLC entity includes an RLC AM entity or an RLC UM entity.

In a one hundredth and twenty-eighth aspect, in combination with the one hundredth and twenty-fifth aspect, the communication session includes a unicast communication session, a multicast communication session, or a broadcast communication.

In a one hundredth and twenty-ninth aspect, in combination with the one hundredth and twenty-fifth aspect, the communication window includes a Tx window, an Rx window, or a combination thereof.

In a one hundredth and thirtieth aspect, in combination with the one hundredth and twenty-fifth aspect, the set of state variables include a window size of the communication window, a lower edge value for the communication window, an upper edge value for the communication window, or a combination thereof.

In a one hundredth and thirty-first aspect, in combination with the one hundredth and twenty-sixth aspect, the techniques further include transmitting an RRC message that indicates the set of initial values, or, after transmitting the control message, transmitting or receiving a packet associated with the communication session.

In a one hundredth and thirty-second aspect, in combination with the one hundredth and twenty-sixth aspect, the techniques further include determining whether the UE joined the communication session or completed a handover operation, wherein the control message is transmitted to the UE based on a determine that the UE joined the communication session or completed the handover operation.

In a one hundredth and thirty-third aspect, in combination with the one hundredth and thirty-second aspect, the RLC control message is transmitted to the UE independent of an RLC SN associated with the communication session.

In a one hundredth and thirty-fourth aspect, in combination with the one hundredth and twenty-fifth aspect, the techniques further include generating one or more synchronization PDUs, each of the one or more synchronization PDUs including a respective indication of a corresponding update of the set of state variables.

In a one hundredth and thirty-fifth aspect, in combination with the one hundredth and thirty-fourth aspect, the techniques further include initiating transmission of or transmitting the one or more synchronization PDUs.

In a one hundredth and thirty-sixth aspect, in combination with the one hundredth and thirty-fifth aspect, the one or more synchronization PDUs include multiple synchronization PDUs transmitted periodically.

In a one hundredth and thirty-seventh aspect, in combination with the one hundredth and thirty-fifth aspect, each synchronization PDU of the one or more synchronization PDUs is included in a respective RLC data PDU that includes an RLC SN assigned based on the communication session.

In a one hundredth and thirty-eighth aspect, in combination with the one hundredth and twenty-fifth aspect, the control message includes a PDCP control message.

In a one hundredth and thirty-ninth aspect, in combination with the one hundredth and thirty-eighth aspect, the techniques further include determining whether the UE joined the communication session or completed a handover operation, wherein the PDCP control message is transmitted to the UE based on a determination that the UE joined the communication session or completed the handover operation.

In a one hundredth and fortieth aspect, in combination with the one hundredth and thirty-eighth aspect, the techniques further include generating one or more synchronization PDUs, each of the one or more synchronization PDUs including a respective indication of a corresponding update of the set of state variables.

In a one hundredth and forty-first aspect, in combination with the one hundredth and fortieth aspect, the techniques further include initiating transmission of or transmitting the one or more synchronization PDUs.

In a one hundredth and forty-second aspect, in combination with the one hundredth and forty-first aspect, the one or more synchronization PDUs include multiple synchronization PDUs transmitted periodically.

In a one hundredth and forty-third aspect, in combination with the one hundredth and forty-first aspect, each synchronization PDU of the one or more synchronization PDUs is included in a respective PDCP data PDU.

In a one hundredth and forty-fourth aspect, in combination with the one hundredth and forty-first aspect, at least one synchronization PDU of the one or more synchronization PDUs is transmitted based on a determination that the UE transitioned from a physical layer being out-of-sync to a physical layer being in-sync, a determination that a number of packet retransmissions is greater than or equal to a threshold, a network load balancing or retransmission policy, or a determination that a PDCP level is lost.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication performed by a user equipment (UE), the method comprising:
   receiving a control message generated at a network entity, the control message indicating a value of a state variable maintained by the network entity, the state variable associated with a communication window of a communication session established with the network entity;
   setting, based on the control message, the state variable to the value from a previous value in accordance with a lack of synchronization between the UE and the network entity; and
   receiving data associated with the communication session within the communication window based on the value of the state variable.

2. The method of claim 1, wherein the control message includes a packet data convergence protocol (PDCP) control message.

3. The method of claim 1, further comprising:
   synchronizing the communication window with the network entity based on setting the state variable to the value.

4. The method of claim 1, wherein the state variable includes a receive state variable (RX_NEXT), a receive deliver state variable (RX_DELIV), or both.

5. The method of claim 1, further comprising:
   initializing the state variable to the previous value selected from among a plurality of possible previous values.

6. The method of claim 1, wherein the value is distinct from the previous value.

7. The method of claim 1, wherein the communication session includes a unicast communication session, a multicast communication session, or a broadcast communication session.

8. The method of claim 1, wherein the communication session includes a multicast communication session, the method further comprising:
   joining the communication session, wherein receiving the control message is in response to joining the communication session.

9. The method of claim 1, wherein the control message is included in a radio resource control (RRC) message.

10. The method of claim 1, wherein the data includes packet data convergence protocol (PDCP) data.

11. The method of claim 1, wherein receiving the control message includes receiving the control message as part of a handover operation between a second network entity and the network entity.

12. The method of claim 1, wherein transmitting the control message to the UE includes transmitting the control message to the UE in response to joining the communication session with the UE.

13. An apparatus for wireless communication, the apparatus comprising:
   a processing system that includes one or more processors and one or more memories coupled with the one or more processors, the processing system configured to:
     receive a control message generated at a network entity, the control message indicating a value of a state variable maintained by the network entity, the state variable associated with a communication window of a communication session established with the network entity;
     set, based on the control message, the state variable to the value from a previous value in accordance with a lack of synchronization between the apparatus and the network entity; and
     receive data associated with the communication session within the communication window based on the value of the state variable.

14. The apparatus of claim 13, wherein the control message includes a packet data convergence protocol (PDCP) control message.

15. The apparatus of claim 13, wherein the processing system is further configured to:
   synchronize the communication window with the network entity based on setting the state variable to the value.

16. The apparatus of claim 13, wherein the state variable includes a receive state variable (RX_NEXT), a receive deliver state variable (RX_DELIV), or both.

17. The apparatus of claim 13, wherein the processing system is further configured to:
   initialize the state variable to the previous value selected from among a plurality of possible previous values.

18. The apparatus of claim 13, wherein the value is distinct from the previous value.

19. The apparatus of claim 13, wherein the communication session includes a unicast communication session, a multicast communication session, or a broadcast communication session.

20. The apparatus of claim 13, wherein the communication session includes a multicast communication session, and wherein the processing system is further configured to:
   join the communication session, wherein, to receive the control message, the processing system is configured to receive the control message in response to joining the communication session.

21. The apparatus of claim 13, wherein the control message is included in a radio resource control (RRC) message.

22. The apparatus of claim 13, wherein the data includes packet data convergence protocol (PDCP) data.

23. The apparatus of claim 13, wherein, to receive the control message, the processing system is configured to:
   receive the control message as part of a handover operation between a second network entity and the network entity.

24. A method of wireless communication performed by a network entity, the method comprising:
   generating a control message that indicates a value of a state variable maintained by the network entity, the state variable associated with a communication window of a communication session established with a user equipment (UE), wherein generating the control message that indicates the value is in accordance with a lack of synchronization between the UE and the network entity;
   transmitting the control message to the UE; and
   transmitting, to the UE, data associated with the communication session within the communication window based on the value of the state variable.

25. The method of claim 24, wherein the control message includes a packet data convergence protocol (PDCP) control message, and wherein the control message is included in a radio resource control (RRC) message.

26. The method of claim 24, wherein the value is distinct from a previous value of a corresponding instantiation of the state variable stored in a memory of the UE.

27. An apparatus for wireless communication, the apparatus comprising:
   a processing system that includes one or more processors and one or more memories coupled with the one or more processors, the processing system configured to:
   generate a control message that indicates a value of a state variable maintained in the one or more memories, the state variable associated with a communication window of a communication session established with a user equipment (UE), wherein generating the control message that indicates the value is in accordance with a lack of synchronization between the UE and the apparatus;
   transmit the control message to the UE; and
   transmit, to the UE, data associated with the communication session within the communication window based on the value of the state variable.

28. The apparatus of claim 27, wherein the control message includes a packet data convergence protocol (PDCP) control message, and wherein the control message is included in a radio resource control (RRC) message.

29. The apparatus of claim 27, wherein the value is distinct from a previous value of a corresponding instantiation of the state variable stored in the one or more memories of the UE.

30. The apparatus of claim 27, wherein, to transmit the control message, the processing system is configured to transmit the control message to the UE in response to joining the communication session with the UE.

* * * * *